United States Patent [19]

Oldfield

[11] Patent Number: 4,994,003

[45] Date of Patent: Feb. 19, 1991

[54] APPARATUS USING AERODYNAMIC ROTORS FOR EXERTING A BRAKING TORQUE UPON A ROTATING SHAFT

[75] Inventor: Thomas A. Oldfield, Columbus, Ind.

[73] Assignee: Anchor Tech, Inc., St. Augustine, Fla.

[21] Appl. No.: 310,199

[22] Filed: Feb. 13, 1989

Related U.S. Application Data

[63] Continuation-in-part of Ser. No. 58,358, Jun. 4, 1981, Pat. No. 4,827,798.

[51] Int. Cl.⁵ ............... F16H 47/04; F16H 37/06; F16D 57/02; B60K 41/26
[52] U.S. Cl. ........................... 475/72; 475/76; 475/80; 188/291; 192/4 A
[58] Field of Search ............... 192/4 A, 4 B, 12 A; 74/675, 687, 705, 718, 720, 794; 188/270, 290, 291; 475/76, 53, 59, 62, 73, 35, 36, 218, 72

[56] References Cited

U.S. PATENT DOCUMENTS

| | | | |
|---|---|---|---|
| 1,212,302 | 1/1917 | Wilder | 188/270 |
| 1,225,009 | 5/1917 | Carstarphen | 188/270 |
| 2,147,932 | 2/1939 | Smith | 188/291 |
| 2,215,058 | 9/1940 | Van Maren | 188/99 |
| 2,323,252 | 2/1941 | Mathey | 188/90 |
| 2,361,739 | 10/1944 | Bobst | 188/94 |
| 2,415,670 | 2/1947 | Black et al. | 188/291 |
| 2,544,606 | 3/1951 | Mallory | 180/54 |
| 2,864,473 | 12/1958 | Christenson et al. | 192/4 B |
| 3,033,322 | 5/1962 | Hughes | 188/91 |
| 3,062,327 | 11/1962 | Debus | 188/290 |
| 3,103,997 | 9/1963 | Shealy et al. | 192/4 |
| 3,132,533 | 5/1964 | Baker | 74/687 |
| 3,182,759 | 5/1965 | Kelemen | 188/270 |
| 3,216,536 | 9/1965 | Henschel | 188/90 |
| 3,236,338 | 2/1966 | Mayer | 188/290 |
| 3,597,998 | 8/1971 | Ebert | 74/687 |
| 3,683,719 | 8/1972 | Gros | 74/661 |
| 3,834,985 | 9/1974 | Gullberg | 162/280 |
| 3,859,970 | 1/1975 | Dreisin | |
| 4,114,734 | 9/1978 | Bultmann | 188/274 |
| 4,271,796 | 6/1981 | Sickler et al. | 123/321 |
| 4,572,114 | 2/1986 | Sickler | 123/21 |

FOREIGN PATENT DOCUMENTS 0101118  9/1925  Austria.
0855852  2/1939  France.
0623032  8/1978  U.S.S.R.

OTHER PUBLICATIONS

Article from *Discovery*, Jul. 1986 entitled "Using Your Brakes Can Help You Get Going".

*Primary Examiner*—Leslie A. Braun
*Assistant Examiner*—Khoi Q. Ta
*Attorney, Agent, or Firm*—Woodard, Emhardt, Naughton, Moriarty & McNett

[57] ABSTRACT

A device for providing a variable retarding torque upon a rotating shaft includes an aerodynamic rotor and control means which is responsive to independent and external signals to continuously vary the ratio of the speed of the aerodynamic rotor as compared to the speed of the rotating shaft. The control means includes a multiple disc, dynamic, torque limiting friction clutch which is operable to vary the torque transferred between the rotating shaft and the rotor. Modulation of the dynamic clutch may be done at any time during active operation of the device.

9 Claims, 12 Drawing Sheets

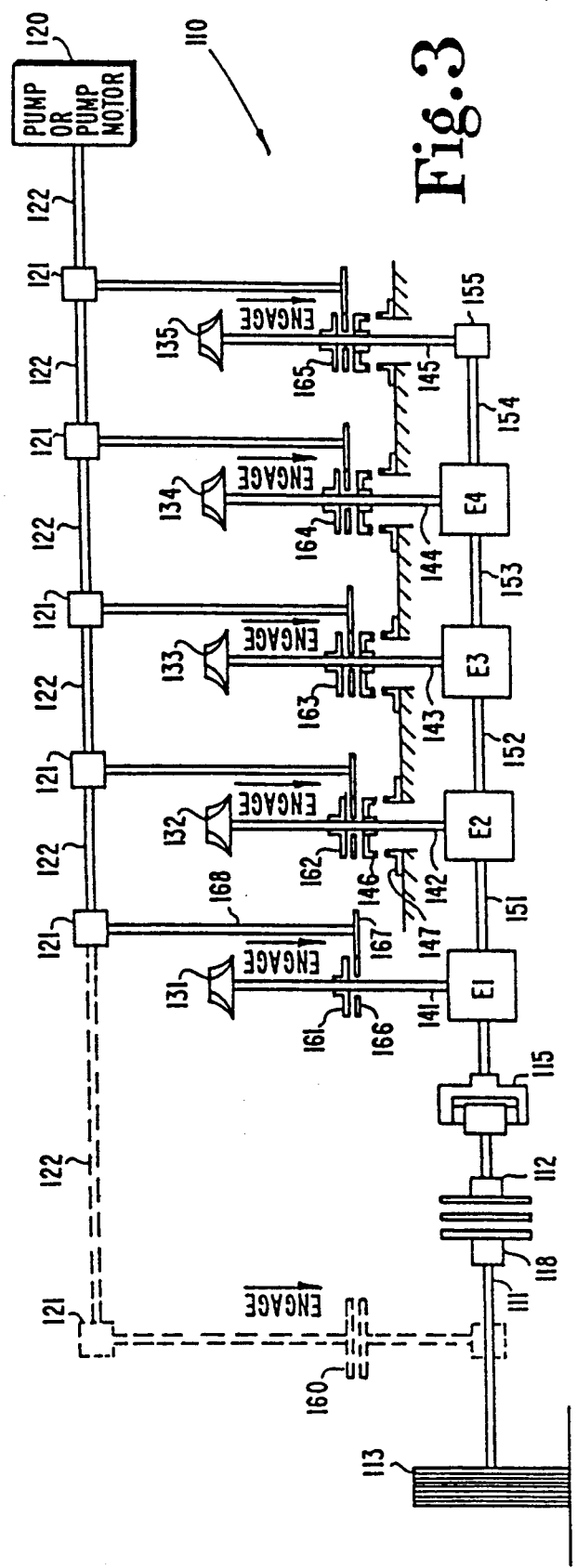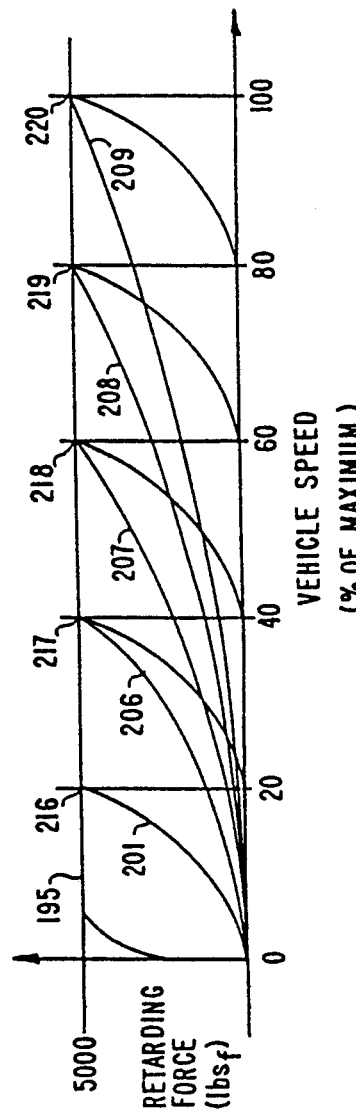
Fig.3
Fig.4

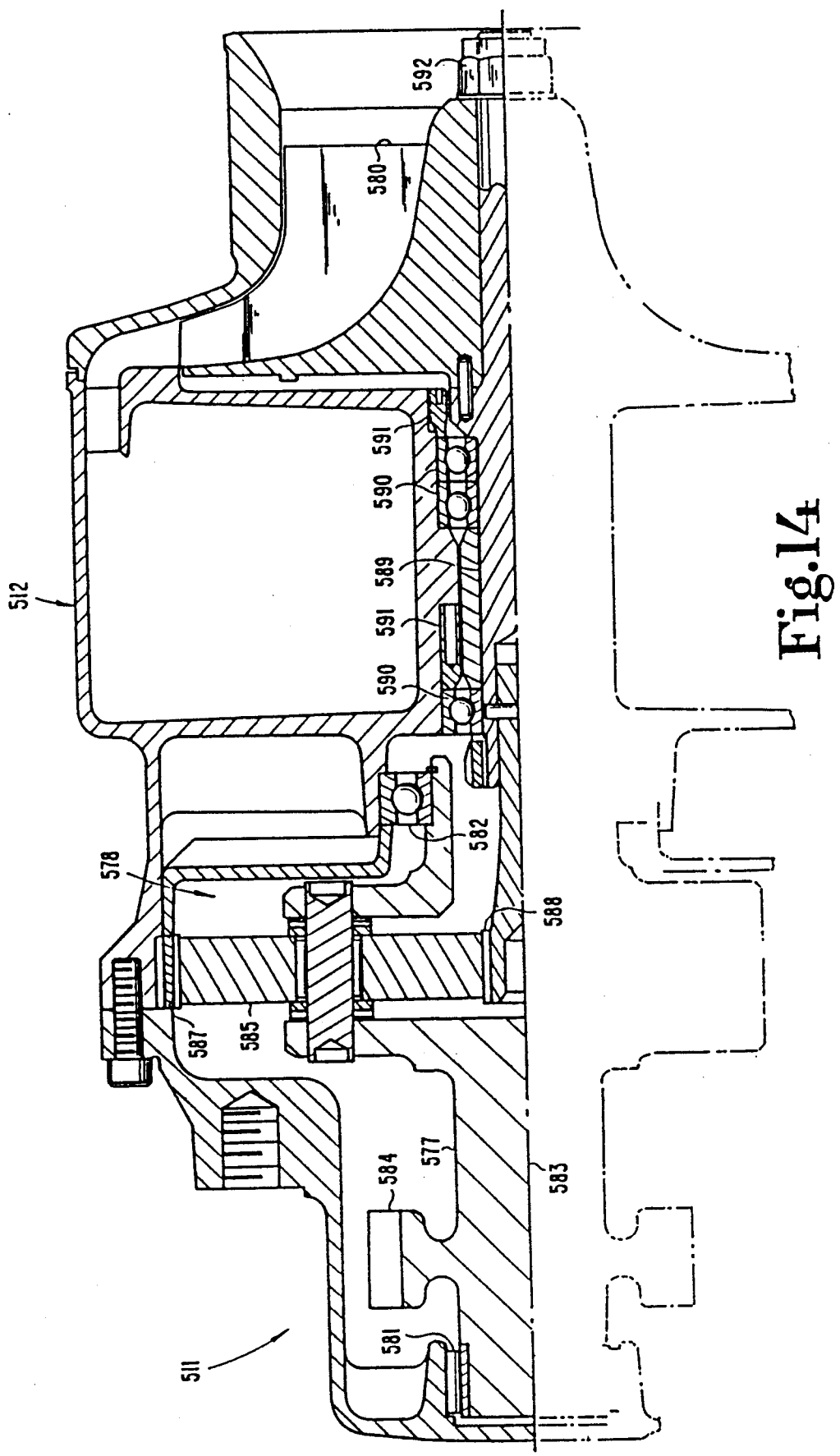

APPARATUS USING AERODYNAMIC ROTORS FOR EXERTING A BRAKING TORQUE UPON A ROTATING SHAFT

CROSS-REFERENCE TO RELATED APPLICATIONS

This application is a continuation-in-part of my co-pending U.S. patent application Ser. No 58,358, filed June 4, 1987, now U.S. Pat. No. 4,827,798.

FIELD OF THE INVENTION

This invention relates to the field of braking systems, and in particular to a braking system using an aerodynamic rotor to exert a constant or operator-controlled retarding force upon a rotating shaft such as upon the drive train of a vehicle.

BACKGROUND OF THE INVENTION

When a large, fully loaded semi-trailer (which weighs about 80,000 lbs.) descends a 6° downgrade at highway speeds for one or two miles, some fOrm of braking other than the trucks own service brakes are generally required to avoid a runaway. Although some of the potential energy of the truck is absorbed by engine work, aerodynamic drag, rolling resistance, etc , the service brakes and/or retarder will be called upon to absorb about 400 hp at 40 mph and 700 hp at 80 mph. While service brakes can apply enough torque to skid the wheels initially, their effectiveness decreases rapidly as they absorb energy and heat up. The vehicle may then regain speed requiring more braking resulting in further brake loss. An on-off, systematic application of the service brakes may be sufficient to control the semi without overheating, but there is still a fairly great risk of fade and complete brake loss.

Numerous braking systems have been developed to assist the truck's service brakes, the most notable of which is the "Jacob s brake" which is described in U.S. Pat. No. 4,572,114. The Jacob's brake is a compression release engine retarder which temporarily disables the normal operation of the engine and converts the standard engine into an air compressor for developing a retarding horsepower. Although representing a significant addition to the service brakes of a vehicle, the compression release engine retarder has serious drawbacks. First, the compression release brake, and similar systems interfaced with the engine, produce a force which is limited by the size and rpm capability of the engine. These brakes can only provide the needed amount of retardation force over long and/or steep grades with the vehicle at a relatively slow speed and with the compression release brake operated at a high engine r.p.m. Once engaged, it is difficult and can be hazardous to shift into a lower gear.

Another system, the hydraulic retarder, has a large power capability and is easy to control However, dissipation of the braking energy is commonly done through the vehicle's own cooling system. This severely limits the retarder performance, complicates the installation and makes these systems more expensive than the compression release system.

Yet another system, the electrical brake system, though providing a noticeable braking addition, has become unpopular due to cost, weight, fade and inertia factors, especially on the larger on-highway trucks.

Another vehicle braking system which is not interfaced with the engine is disclosed in Bultmann, U.S. Pat. No. 4,114,734. The Bultmann device has two oppositely rotating and opposing rotors coupled directly to the drive shaft of a vehicle. The Bultmann device, however, requires a separate cooling system to dissipate the heat generated by the rotors. It also is not capable of producing a constant or operator regulated retardant force.

Under current EEC legislation (European Economic Community), laden vehicles shall be tested in such a manner that the vehicle's braking system be able to withstand a braking input on a 6% downward grade for 6 km at 30 kph. What is needed is a device which meets this retarding force at all speeds down to zero, without fade, in continuous operation and without service brake assistance. Furthermore, the device should be non-intrusive upon the engine, lightweight, compact and inexpensive, applicable to all vehicles regardless of their engine size and be capable of integration into the vehicle transmission and/or the axle systems.

SUMMARY OF THE INVENTION

Generally speaking, there is provided a self-contained device for retarding the motion of a vehicle, at all speeds, without fade, without intruding upon the engine and without being substantially dependent upon the vehicle's speed or gear shift apparatus for its output force. According to one embodiment, a retarder includes an inner drive unit, a static clutch pack, a dynamic clutch pack and an aerodynamic rotor. A drive shaft serially connected with the vehicle drive train drives the inner drive unit which drives the dynamic clutch pack which drives both the aerodynamic rotor and the static clutch pack. Variable actuation of the dynamic clutch pack modulates the ratio of the speed of rotation between the rotor and the drive train of the vehicle, creating a variable retarding torque upon the drive train and thereby producing a variable retarding force upon the motion of the vehicle. Variable actuation of the static clutch pack arguments augments the retarding torque at all speeds.

In another embodiment, synchro dog clutch assembly is mechanically interposed between the drive shaft and the inner drive unit. the inner drive unit and related components do not rotate when the retarder is not engged thus substantially eliminated parasitic losses.

It is an object of the present invention to provide an improved retarder.

Another object of the present invention is to provide a retarder for vehicles capable of providing a constant retarding torque at all speeds irrespective of grade or duration of engagement.

It is a further object of the present invention to provide a retarder for vehicles which is not intrusive or dependent upon the engine or gear shifting components for its effectiveness.

These and further objects of the present invention will become apparent from the following description.

BRIEF DESCRIPTION OF THE DRAWINGS

FIG. 3 is a diagrammatic view of a retarder in accordance with another embodiment of the present invention.

FIG. 4 is a graph illustrating the relationship of speed of the vehicle to braking force produced by the retarder of FIG. 3.

FIG. 14 is a side, cross-sectional view of the rotor assembly of the retarder of FIG. 10 taken along the lines 14—14 and viewed in the direction of the arrows and without the intake duct assembly and exhaust pipe assembly.

DESCRIPTION OF THE PREFERRED EMBODIMENT

Figure 1:
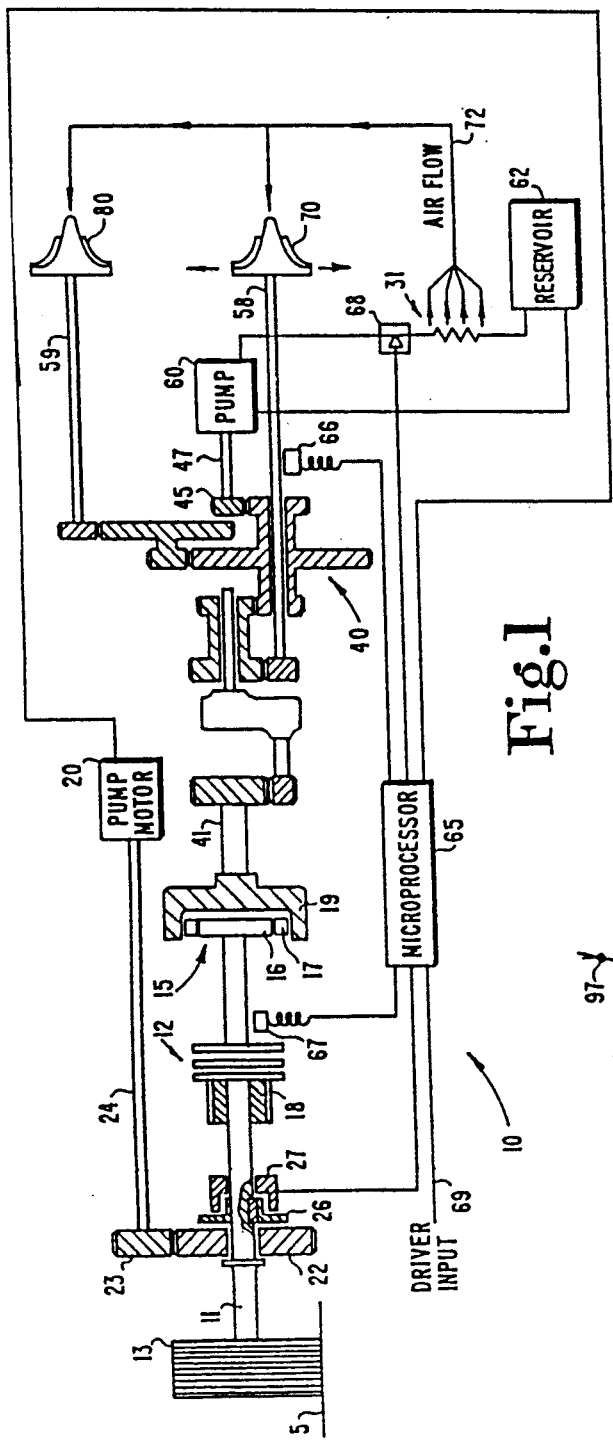
FIG. 1 is a diagrammatic view of the retarder in accordance with one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, there is shown a retarder system 10 in accordance with one embodiment of the present invention. It is driven by input shaft 11 which is engaged with and driven by any member of the vehicle which is engaged with ground 5. It may be engaged directly with the transmission drive shaft or it may be driven by a single axle. If the system is used on a train or other vehicle which travels by rail, the input shaft would be integrated with a wheel engaged with a braking rail. In the preferred embodiment, shaft 11 is driven by a single axle, but for purposes of description, system 10 will be described as engaged with a single wheel 13 of a vehicle (not shown). System 10 is selectively engaged with ground engaging wheel 13 of the vehicle by a torque limiting friction clutch 12. Clutch 12 provides direct engagement between shaft 11 and the remainder of the system when the torque felt by clutch 12 is below a pre-selected level. When the magnitude of torque exceeds the pre-selected level, clutch 12 slips, transmitting only the maximum pre-selected torque and corresponding rotation. The remainder of retarder system 10 includes a sprag clutch 15, a regenerative pump/motor 20, an epicyclic gear train 40, a control pump 60, first aerodynamic rotor 70, and second aerodynamic rotor 80. A retarding torque is created by rotation of first aerodynamic rotor 70. The precise value of that retarding torque is regulated, through microprocessor 65, by the control means of the present embodiment, which includes gear train 40, second aerodynamic rotor 80 and pump 60. The retarding torque is transmitted through system 10 to ground engaging wheel 13 where, via friction with ground surface 5, a retarding force is exerted upon the vehicle.

For purposes of description, positive rotation, movement, reaction or torque as used herein shall refer to the direction of rotation, movement, reaction or torque of any element which, if engaged with ground engaging wheel 13, is consistent with the rotation of that wheel for forward motion of the vehicle.

Sprag clutch 15 is typical of over running clutches which automatically engage in one direction and free wheel in the other. Upon engagement of clutch 12, for a positive rotational input from shaft 11, driving member 16 will be caused to rotate (clockwise, for example) Contact of driving member 16 with sprags 17 causes sprags 17 to lock-up in frictional engagement with the driven member 19. Driving member 16, sprags 17 and driven member 19 then rotate as a unit so long as the angular velocity of driven member 19 does not exceed the angular velocity of driving member 16, at which time no force is transmitted between members 16 and 19 (except for infinitesimal forces from the sliding sprags).

Driven member 19 drives epicyclic input shaft 41 of gear train 40. Gear trains such as gear train 40, having first and second output shafts 58 and 59, are well known. Rigidly, axially mounted at the end of first and second output shafts 58 and 59 are first and second aerodynamic rotors 70 and 80, respectively. Gear train 40 also includes pinion 45 which rotates in direct rotational proportion with second output shaft 59. Rotation of pinion 45, and thus shaft 59 and rotor 80, is modulated by pump 60 via rigidly interconnecting shaft 47.

Figure 2:
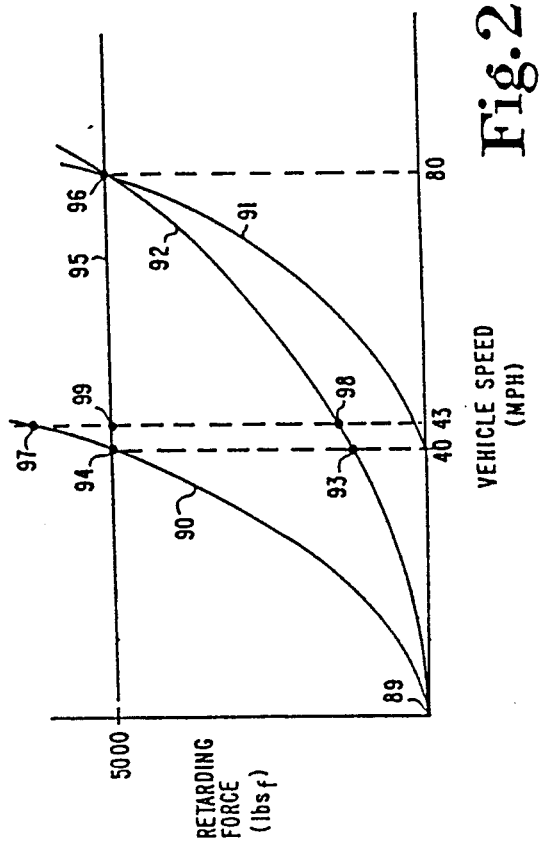
FIG. 2 is a graph illustrating the relationship of speed of the vehicle to braking force produced by the retarder of FIG. 1.
Figure 6:
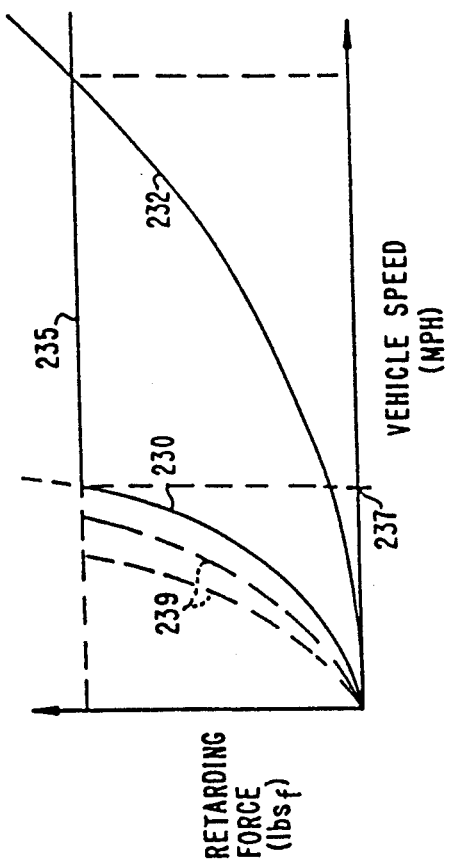
FIG. 6 is a graph illustrating the relationship of speed of the vehicle to braking force produce by the retarder of FIG. 5.

Rotors 70 and 80 are aerodynamic rotors, each of which includes an impeller and an inducer of a type commonly found in turbochargers. The torque required to operate one such rotor is approximately proportional to the square of the angular velocity of the rotor. The torque required to rotate one rotor is employed by the present invention as the retarding force resistive to the input from ground engaging wheel 13. Curve 90 in FIG. 2 shows the relationship for one such rotor of retarder system 10 with the resultant retarding or braking force to the vehicle plotted as a function of the speed of the vehicle.

If a given single aerodynamic rotor were engaged when the vehicle was traveling at a given speed (40 m.p.h. for example), a retarding force (5,000 lb. for example) would be exerted by that rotor, through system 10 and upon ground engaging wheel 13. As the vehicle slows, the retarding force would decay rapidly at a rate proportional to twice the velocity (curve 90). For speeds greater than 40 mph, engagement would also be possible with the same system configuration. However, due to the square law relationship, the resulting retarding force from engagement at just 45 mph, for example would be about 1,300 lbs. higher which could result in damage to the system due to exceeding the stress limits. (Assuming that the maximization of components had resulted in the most compact rotor operable within the given parameters.) Conversely, if a single aerodynamic rotor were used to produce the desired maximum breaking force (5,000 lbs.) at 80 mph, the resulting system would be substantially ineffective at lower speeds as its retarding capabilities decrease rapidly as the vehicle's speed decreases (similar to curve 92, FIG. 2).

The retarding system shown in FIG. 1, using two aerodynamic rotors, does provide constant braking force over the desired broad speed range. The braking force/mph relationship of a second, identical aerodynamic rotor 80, operable within the same speed range (40 mph), is shown by curve 91 in FIG. 2. And, epicyclic gear trains such as gear train 40 are torque balancing. That is, for a given input torque, the torque seen by shaft 58 will equal that of shaft 59. Since shaft 47 is operatively engaged with shaft 59, the sum of torques from shafts 47 and 59 will equal that of shaft 58. If pump 60 offers zero pressure, thus zero torque applied to shaft 47, then the torques of shafts 58 and 59 will be equal. Their speeds will also be equal due to this identical size of rotors 70 and 80 and the gear sizes of gear train 40. The braking force produced by the combined, free rotation of rotors 70 and 80 would be as shown by curve 92 in FIG. 2. Thus, at 40 mph, for example, if both rotors are free to rotate, the braking force will be at a level indicated by point 93. If pump 60 holds rotor 80 fixed, causing rotor 70 to rotate at full speed, the braking force will be along curve 90 at point 94. Adjustment of pump 60 to permit some rotation of pinion 45, and thus rotor 80, will produce a braking force somewhere between points 93 and 94. It can readily be seen then, that for a given vehicle speed between 40 mph and 80 mph, modulation of pump 60 can produce a braking force anywhere between curves 90 and 92. It can also be seen that a constant braking force, 5,000 lbs., for example, as indicated along line 95, can be produced by appropriate modulation of pump 60.

Modulation of pump 60 is done by a standard control valve 68 which modulates the fluid pressure flowing from pump 60 to reservoir 62 and which ultimately controls the speed of rotation of shaft 47. Modulation of control valve 68 is governed solely by microprocessor 65, the input from which comes from speed sensors 66 and 67 engaged with and reading the speed of shaft 58 and driving member 16, respectively. Microprocessor 65 could be programmed to maintain a constant braking force from retarder system 10 whenever system 10 is engaged. Microprocessor 65 may also be designed to allow for driver input 69, permitting the driver to command a retarding force anywhere below line 95.

Additionally, any value below curve 92 may be produced by repetitive on/off engagement of clutch 12.

Rotors 70 and 80 have sufficient angular momentum such that they will not slow down to a stop for several seconds upon disengagement, depending, of course, upon the size of rotors 70 and 80 and the speed at which they are disengaged. Thus, appropriate programming of microprocessor 65 to control pump 60 and clutch 12 can produce smooth cyclic engagement/disengagement of system 10 to produce values below curve 92.

Assuming that the components are sized to produce the values shown in FIG. 2, the gear train, dual rotor, pump combination and microprocessor 65 work as follows:

For vehicle speeds between 0 and 40 mph, engagement of retarder system 10 produces a braking force, shown by curve 90, with a maximum braking force of 5,000 lbs. (point 94). Speed sensor 67 relays signals corresponding to the input speed of 40 mph or less to microprocessor 65 which then commands pump 60 to completely preclude rotation of pinion 45, and thus rotor 80. The braking force of retarder system 10, as a function of mph, will be produced solely by rotor 70 and will be along curve 90. Addition of a second pump 20 (described herein) could be added to maintain a maximum braking force for speeds below 40 mph.

Ignoring standard relief valves on pump 60 and the effect of torque limit clutch 12 (described herein), next considered is the situation where the retarder system 10 is engaged when the vehicle is traveling faster than 40 mph (43 mph, for example). A maximum retarding force of approximately 5,800 lbs. could be produced if pump 60 were to hold rotor 80 completely idle leaving only rotor 70 to rotate (point 97). If pump 60 permitted free rotation of rotor 80, the retardation force would be as indicated at point 98 on curve 92. Instead, speed sensor 67 relays the input speed to microprocessor 65 which then commands pump 60 to exert only so much pressure against rotation of shaft 47 and pinion 45. The remainder of torque needed to balance the torque of rotating shaft 58 within gear train 40 is produced by the rotation of rotor 80. By proper programming of microprocessor 65, the retarding force seen by shaft 11 is always along line 95. Engagement of retarder 10 closer to 80 mph signals microprocessor 65 to command very little resistance from pump 60, the bulk of the balancing torque coming from rotor 80.

If the retarder system 10 is engaged when the vehicle is traveling at or above 80 mph, microprocessor 65 now tells pump 60 to offer no resistance to rotor 80, the two rotors operate freely and the torque of shaft 59 exactly balances the torque of shaft 58. The retarding force produced is along curve 92 up to line 95. (Torques corresponding to force values above line 95 are not transmitted to gear train 40 due to torque limit clutch 12 described herein.)

One primary advantage of the retarder system 10 described herein is its ability to dissipate the braking energy. Rather than require separate cooling means, the aerodynamic rotors convert the majority of the braking energy to work by increasing the kinetic energy of the air which is then dumped into the atmosphere. Any parasitic heat which is built up within system 10 can be removed by adding heat exchangers 31 which operate by drawing the rotor intake air 72 past the pump's oil flow. The higher temperature intake air to the rotors will also improve the efficiency of retarder system 10. Volutes may be added to convert the kinetic energy of the high speed outlet air into compressed air for purposes such as supplementing the air supply for the vehicle's own service brakes and for service brake cooling.

In practice, system 10 is engaged by torque limit clutch 12. Torque limit clutches such as clutch 12 are well known and will transfer the entire load between input shaft 11 and driving member 16 of sprag clutch 15 until a pre-selected torque limit is reached If the pre-selected torque limit of X ft-lbs (an amount which corresponds with a retarding force of 5,000 lbs., for example) is exceeded, slippage will occur within clutch 12 so that only X ft-lbs. are transferred to sprag clutch 15. Upon initial engagement, even if the vehicle speed is less than 40 mph (FIG. 2), the corresponding braking force level may momentarily start to exceed the value (5,000 lbs.) corresponding with the pre-selected torque limit (X) as the rotors attempt to match the vehicle speed. The torque limit clutch 12 (in conjunction with conventional pressure relief control of pump 60) prevents the torque from exceeding the limit (X) during this initial peak, preventing possible damage to the system. Thus, when system 10 is engaged, regardless of the vehicle speed, the torque limit clutch prevents the braking or retarding force from exceeding line 95 (FIG. 2). As the vehicle then begins to slow, microprocessor 65 modulates pump 60 as described above to maintain the retarding force up to line 95. To prevent initial engagement shock and to further ensure a "smooth engagement", a torsion coupling 18 is provided between input shaft 11 and clutch 12.

If, during retard and service braking, the input from input shaft 11 stopped or slowed drastically due to skidding, service brake lock or hydroplaning, for example, the retarding force would automatically stop since driven member 19 of sprag clutch 15 would overrun driving member 16. As the kinetic energy of the system is dissipated, the speed of driven member 19 will slow until there is again input from input shaft 11 or until the input seen by driving member 16 equals that of driven member 19. The same "smooth engagement" principles operating during initial engagement also act here during skidding-type situations to provide an overall smooth retarding operation.

In the preferred embodiment, regenerative pump/motor 20 is provided for engagement directly with input shaft 11 to complete the range of constant retarder force for urban driving. Rotating freely about shaft 11 is gear 22 which meshes with gear 23 which is rigidly, coaxially connected to the output shaft 24 of regenerative pump/motor 20. Clutch plate 26, splined to rotate with but slide along shaft 11, can be frictionally engaged with gear 22 by activator 27 which responds to signals from microprocessor 65. Referring to FIG. 2, when the vehicle speed drops below 40 and the retarding force produced by rotor 70 decays along curve 90, pump/motor 20 can be engaged to provide additional braking force up to line 95. In the preferred embodiment, pump/motor 20 is regenerative, being capable of storing the braking energy in an accumulator and using it to subsequently accelerate the vehicle. Such application is described in Discover, "Using Your Brakes Can Help You Get Going", July, 1986, page 10. The regenerative system would also be controlled by microprocessor 65.

Figure 7:
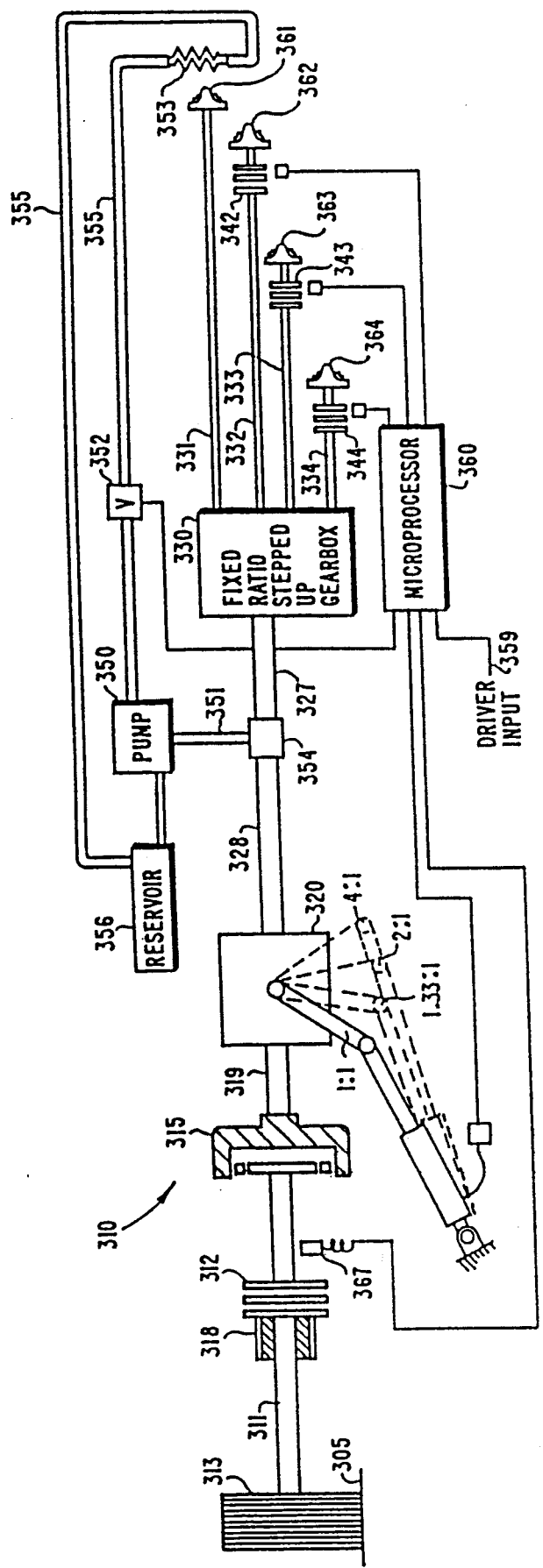
FIG. 7 is a diagrammatic view of a retarder in accordance with another embodiment of the present invention.

In another embodiment shown in FIG. 7 a plurality of aerodynamic rotors 361, 362, 363 and 364 are selectively engagable, the torques produced by each rotor being directly addable within fixed ratio stepped up gearbox 330 to create the total retarding torque. As with retarder 10 of FIG. 1, retarder 310 is driven by and exerts a retarding torque upon road engaging wheel 313 via shaft 311. Retarder 310 is selectively engaged with wheel 313 by torque limit clutch 312. Axially connected torsion coupling 318 and sprag clutch 315 insure smooth engagement and provide bang-bang operation as described above in the description of the embodiment shown in FIG. 1. Output shaft 319 of sprag clutch 315 is the input to variable ratio gearbox 320. Output shaft 328 of gearbox 320 drives gearbox 354 which drives conventional fixed ratio stepped-up gearbox 330 via shaft 327 and pump 350 via shaft 351. The four output shafts 331, 332, 333 and 334 of gearbox 330 are all driven by gearbox 330 to rotate at the same speed. Gearbox 330 is of the type that the sum of the torques of output shafts 331, 332, 333 and 334 is equal to the torque of shaft 327 coming into gearbox 330 Aerodynamic rotor 361 is rigidly connected at the end of shaft 331 and is thus always engaged. Secondary rotors 362, 363 and 364 are selectively engaged to be driven by shafts 332, 333 and 334 via clutches 342, 343 and 344, respectively. In this embodiment, these clutches are empty/fill fluid clutches. A pump 350 is engaged with and driven by output shaft 328 via drive shaft 351 and gearbox 354. Variable relief valve 352 governs the output flow of fluid through pump 350 with fluid lines 355, heat exchanger 353 and reservoir 356 completing the fluid circuit. Variable ratio gearbox 320 provides output (shaft 328) to input (shaft 319) ratios of 4:1, 2:1, 1.33:1 and 1:1. Fixed ratio gearbox 330 provides an input to output ratio of approximately 20:1. Microprocessor 360 controls the variable components—torque limit clutch 312, clutches 342, 343 and 344, variable ratio gearbox 320 and relief valve 352.

Figure 8:
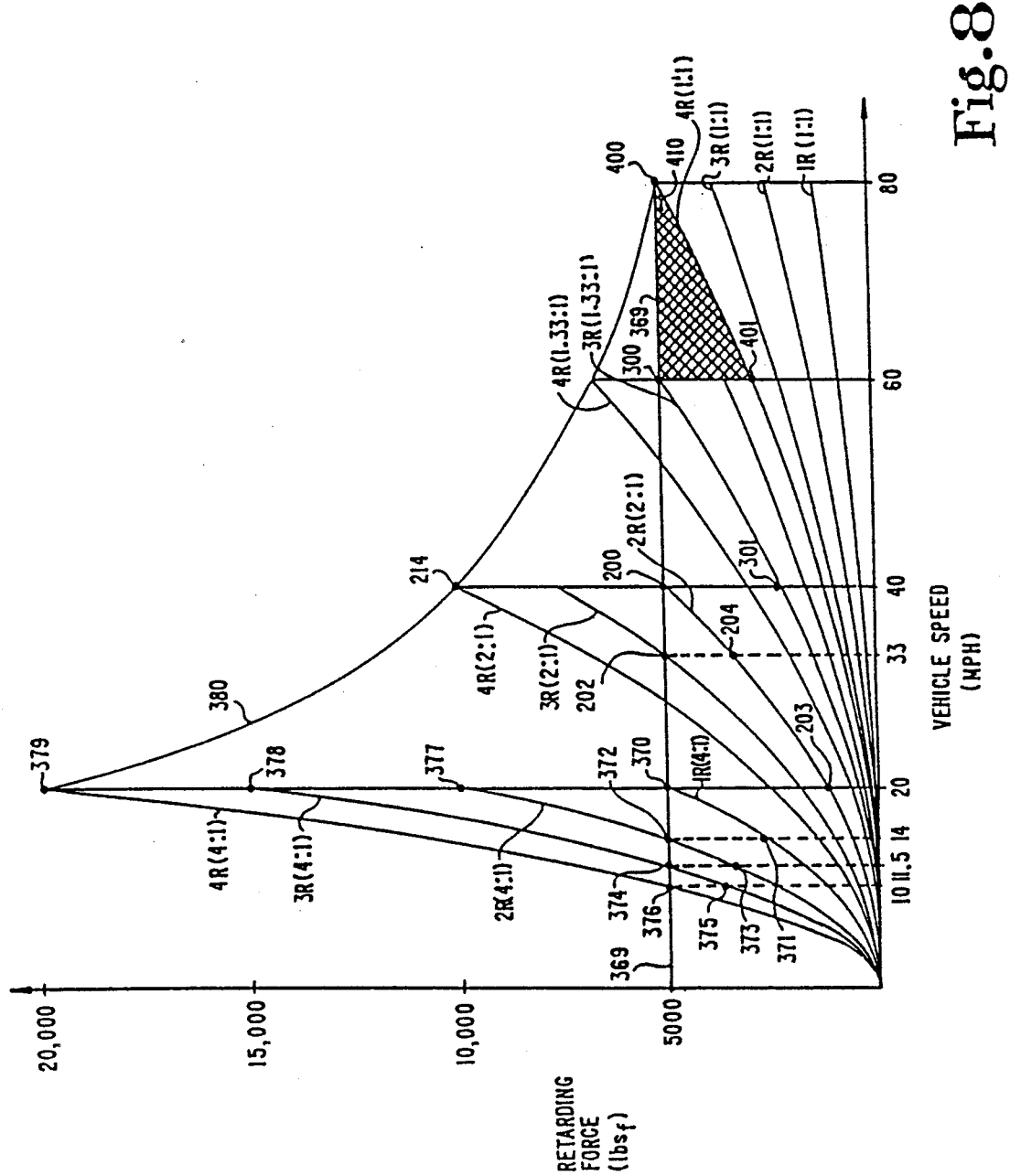
FIG. 8 is a graph illustrating the relationship of speed of the vehicle to braking force produced by the retarder of FIG. 7.

Assuming that the components are sized to produce the values shown in FIG. 8, the rotors, gearboxes, pump, microprocessor and other components operate as follows:

Upon engagement of retarder 310 at a vehicle speed of 20 m.p.h., speed sensor 367 relays signals corresponding to 20 m.p.h. to microprocessor 360 whereupon microprocessor 360 sets the variable ratio gearbox at 4:1. Clutches 342, 343 and 344 are disengaged leaving rotors 362, 363 and 364 idle and rotor 361 fully engaged. The resulting retarding torque produced by rotor 361 transmitted from rotor shaft 331 to input shaft 311 and exerted between wheel 313 and road 305 is 5,000 lbs. represented by point 370 on FIG. 8. As the vehicle slows, the retarding torque to shaft 311 will fall as represented by the one rotor, 4 to 1 curve (1R(4:1)). When the vehicle speed drops to about 14 m.p.h., microprocessor 360 actuates clutch 342 causing engagement of rotor 362. The relationship of output retarding force to vehicle speed is now represented by the two rotor, 4 to 1 (2R(4:1)) curve. The retarding force value shifts from point 371 to point 372, or back up to maximum desired force line 369 (5,000 lbs.). As the vehicle speed drops, the retarding force drops as shown along curve 2R(4:1). When the vehicle speed is about 11.5 m.p.h., microprocessor 360 actuates clutch 343 causing engagement of rotor 363. Now, three rotors, 361, 362 and 363 are all operating with variable ratio gearbox 320 at 4:1. The retarding force as a function of vehicle speed is now represented by curve 3R(4:1), and the retarding force has shifted from the value at point 373 to point 374 on constant force line 369. When the vehicle speed reaches about 10 m.p.h. (point 375), microprocessor 360 actuates the last clutch 344 causing engagement of rotor 364. All four rotors are now engaged with variable ratio gearbox operating at 4:1 and curve 4R(4:1) represents the relationship of retarding force to vehicle speed. Again the retarding force is at 5,000 lbs. (point 376), and, as the vehicle slows the retarding force falls along curve 4R(4:1).

Jumping up to the higher speed range, when retarder 310 is engaged at 80 m.p.h., speed sensor 367 relays signals to microprocessor 360 which then actuates clutches 342, 343 and 344 engaging rotors 362, 363 and 364. Microprocessor 360 also commands variable ratio gearbox 320 to operate at a 1:1 ratio. With all four rotors engaged and variable ratio gearbox 320 at a 1:1 ratio, the retarding force to vehicle speed relationship is governed by the 4R(1:1) curve with the retarding force being on maximum force line 369 at point 400. As vehicle speed slows, the retarding force drops along curve 4R(1:1). When vehicle speed reaches 60 m.p.h. (point 401), microprocessor 360 deactivates clutch 344 causing disengagement of rotor 364 and commands gearbox 320 to shift to a 1.33:1 ratio. The retarding force value shifts from point 401 on curve 4R(1:1) to point 300 on curve 3R(1.33:1). As vehicle speed slows, the retarding force to vehicle speed relationship is represented by curve 3R(1.33:1). When vehicle speed reaches 40 m.p.h. (point 301), microprocessor 360 deactivates clutch 343 causing disengagement of rotor 363 and commands gearbox 320 to shift to a 2:1 ratio. The retarding force shifts from point 301 to point 200 on maximum force line 369 and the retarding force to vehicle speed relationship is now represented by curve 2R(2:1). As the vehicle speed slows, the retarding force approaches the value at point 204. Microprocessor 360 could be programmed to wait until the vehicle speed reaches 20 m.p.h. to reset the components of retarder 310, thus allowing the retarding force to drop to approximately 1,250 lbs (point 203). Alternatively, microprocessor 360 could activate clutch 343 causing engagement of rotor 363 when the vehicle speed reaches about 33 m.p.h. (point 204). With three rotors engaged and gearbox 320 at a 2:1 ratio, the retarding force to vehicle speed relationship would be represented by curve 3R(2:1), and at 33 m.p.h., the retarding force would be at point 202. The retarding force could be allowed to drop along curve 3R(2:1) until the vehicle reaches 20 m.p.h., or microprocessor 360 could engage the fourth rotor at some time before then to bring the retarding force back up to or near the maximum force line of 5,000 lbs.

It can be seen then that appropriate component design of the rotors, fixed ratio stepped up gearbox 330 and variable ratio gearbox 320, and by proper programming of microprocessor 360, a fairly smooth and constant retarding force may be maintained throughout the entire speed range.

The operation of retarder 310 is further enhanced by employment of pump 350. As described previously in connection with pump 60 of FIG. 1, pump 350 may be employed to exert an additional torque onto shaft 328 via shaft 351 and gearbox 354. For example, engagement of retarder 30 at 80 m.p.h. results in a retarding force represented at point 400. As the vehicle slows to 60 m.p.h. (point 401), microprocessor 360 would deactivate clutch 344 thus disengaging rotor 364. It would simultaneously command gearbox 320 to shift to a 1.33:1 ratio. With three rotors 361, 362 and 363 engaged and a 1.33:1 ratio from gearbox 320, the retarding force to vehicle speed relationship is represented by curve 3R(1.33:1), with the retarding force now at point 300. During the time that the vehicle slowed from 80 m.p.h. to 60 m.p.h., a loss of retarding force was experienced within cross-hatched area 410 bounded by points 401, 300 and 403. The loss of torque associated with the lower speed of rotation of each rotor is made up by pump 350. Monitoring the speed of rotational input via speed sensor 367, microprocessor 360 appropriately modulates relief valve 352, causing pump 350 to exert an additional amount of torque upon shaft 328, and thus bringing the total retarding force up to the desired maximum force represented along line 369. Pump 350 is likewise employed throughout the entire speed range in conjunction with variable ratio gearbox 320 and each of the four rotors to produce a constant retarding force along line 369 or any larger retarding force value desired within the operating capacity of the various components. Values of retarding force below any of the curves of FIG. 8 may be commanded by the above-described shifting or by appropriate bang-bang operation described above in connection with FIG. 1. One advantage of this embodiment over the previous embodiment is the ability to use a much smaller pump thus reducing the weight, size and cost of the entire retarder device. Further, with less work required from pump 350 over pump 60 of FIG. 1, the cooling requirements for the pump fluid are greatly diminished. What cooling is required can be achieved by utilizing the inlet flow of one or more of the rotors in conjunction with heat exchanger 353, which is serially connected within the pump system.

Because the effect of the rotors are additive within fixed ratio gearbox 330, a total retarding force of 20,000 lbs. may be achieved using the rotors heretofore described. For example, at 20 m.p.h. with variable ratio gearbox 320 at 4:1 ratio, each rotor produces a torque corresponding to a retarding force of 5,000 lbs. Thus, with only rotor 361 engaged, the output retarding force would be 5,000 lbs. (point 370). If rotor 362 were also engaged, a retarding force of 10,000 lbs. (point 377) would be produced. Likewise, three rotors would produce a retarding force of 15,000 lbs. (point 378) and four rotors would produce 20,000 lbs. (point 379). Microprocessor 360 will not permit force values above curve 380 so as to prevent over speeding the rotors used in this embodiment. Thus, with variable ratio gearbox 320 set at 2:1 ratio, and with all four rotors engaged, 10,000 lbs. of retarding force would be achieved when the vehicle is traveling at approximately 40 m.p.h. (point 214). As the vehicle slows, the retarding force will fall along curve 4R(2:1). If desired, the loss in torque associated with a slower rotation of the rotors can be supplemented by pump 350 as described above. The size of pump 350 will of course determine how much additional torque may be added. It can readily be seen that appropriate component sizing and microprocessor programming can produce nearly any desirable retarding force pattern. Also, as with the previous embodiment, driver input 359 is available to provide instantaneous modulation of retarder 310 at the command of the vehicle driver.

Figure 9:
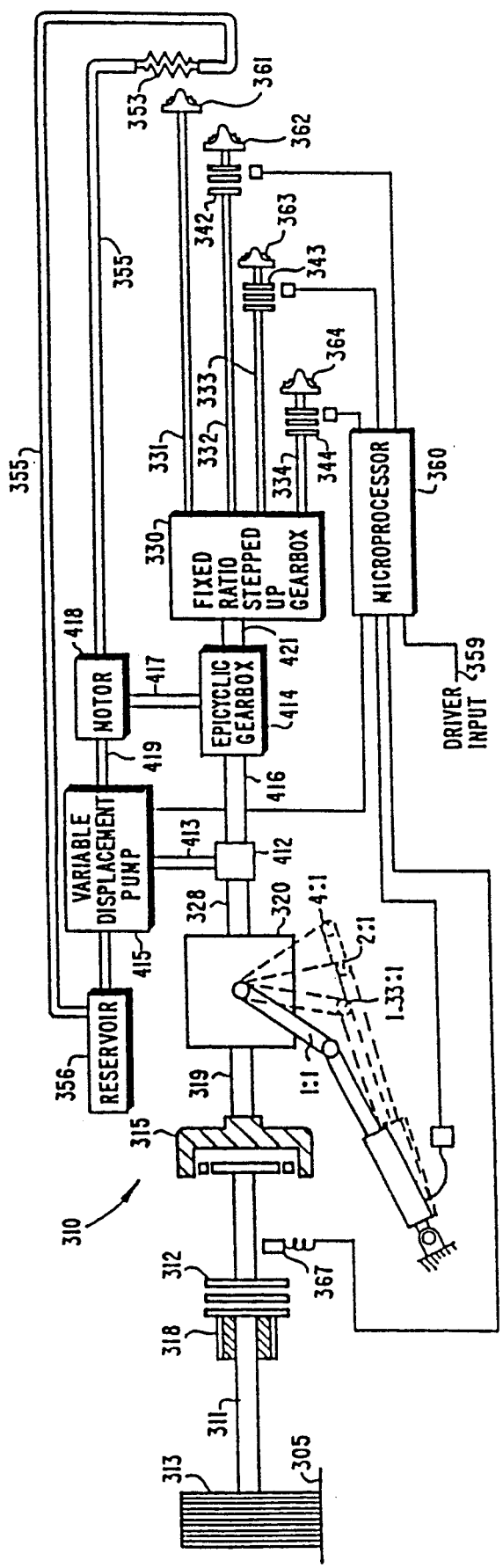
FIG. 9 is a diagrammatic view of the retarder of FIG. 7 with a modification of the pump system and speed ratio control.

In another embodiment, the retarder of FIG. 7 is slightly modified to compensate for the loss of torque due to a dropping input speed. As shown in FIG. 9, standard piston pump 350 (of FIG. 7) is replaced with a conventional variable displacement pump 415.

Output shaft 328 of variable ratio gearbox 320 drives gearbox 412 which has two output shafts 413 and 416. Shaft 416 is one input to epicyclic gearbox 414. The second input 417 to gearbox 414 is provided by fluid motor 418. Motor 418 is driven by output 419 of variable displacement pump 415. Pump 415 receives mechanical rotational input from shaft 413 of gearbox 412. Variable displacement pumps such as pump 415 are well known and can provide a variable displacement output notwithstanding a constant or differently varying input such as from shaft 413. The variable output 419 of pump 415 is governed by signals from microprocessor 360. Fluid lines 355, heat exchanger 353 and reservoir 356 complete the hydraulic circuit of pump 350.

As discussed in the previous embodiment, rotation of one or more rotors (361, 362, 363 and 364) creates a corresponding retarding force upon the vehicle causing the vehicle to slow. As the vehicle slows, the rotational speed of input shaft 319 to gearbox 320 decreases thus providing less rotational input to rotors 361, 362, 363 and 364. The corresponding retarding force therefore drops as shown by the curves of FIG. 8. Input 417 to epicyclic gearbox 414 is thus regulatable by modulating the output of variable displacement pump 415. The result is a precisely modifiable input 421 to fixed ratio gearbox 330 which permits creation of any desired output retarding force. Again, any heat built up within the pump/motor cycle is cooled in heat exchanger 353 by utilizing the input flow of one or more rotors.

Alternative embodiments are provided which include the use of additional rotors. As shown by the retarder system 110 in FIG. 3, any number of rotor/epicyclics may be used. The components of this five rotor system are essentially the same as the two rotor system of FIG. 1 except that only one pump is used and the rotors are smaller. Pump 120 is also smaller than pump 60 of FIG. 1. System 110 can produce a greater aerodynamic retarding horsepower over a broader range of vehicle speed. A retarding torque is again Produced by one aerodynamic rotor, (or by two or three, etc. rotors turning freely with respect to one another), with the precise retarding torque being regulated by the control means. In this embodiment, the control means is responsive to a microprocessor (not shown) and includes one aerodynamic rotor, a single pump, a single epicyclic gear train and various clutching and locking mechanisms.

Again connected to a ground engaging wheel 113 is input shaft 111 which is engagable with system 110 by torque limit clutch 112. Sprag clutch 115 is serially engaged between clutch 112 and the remainder of the system to provide anti-skid characteristics. Sprag clutch 115 then drives the first epicyclic gear train which is identical to gear train 40 shown in FIG. 1. One output of E1 is shaft 141 which terminates in rotor 131. The second output of E1 is shaft 151 which is the input of E2. Epicyclic gear train E2, its two output shafts 142 and 152 and rotor 132 are identical to that of E1 and its components, just described, as well as those of successive epicyclic gear trains E3 and E4. Second output 154 of E4 is in direct engagement with rotor 135 by bevel gear 155 and shaft 145. As will become apparent, an infinite number of rotor/epicyclics may be added, limited only by practical considerations such as space, weight and cost.

Encircling each output shaft 141, 142, 143, 144 and 145, and splined to rotate therewith are identical clutch plates 161, 162, 163, 164, and 165, respectively Clutch plate 161, like the others, is axially slidable along shaft 141 for engagement with encircling gear 166, which is freely rotatable about shaft 141. Gear 166 is in constant meshing engagement with pinion 167 which is rigidly, axial connected to pump shaft 168. Shaft 168 is ultimately, continuously engaged with pump 120 via bevel gears 121 and connecting shafts 122. Each of the other epicyclic output shafts 142, 143 and 144 and shaft 145 are identically engagable with pump 120. Each of the last four shafts 142, 143, 144 and 145 are also provided with the following identical means for being locked with ground. Splined to coaxially, fixedly rotate with shaft 142 is locking disk, 146. Disc 146 is axially slidable along shaft 142 for engagement with an appropriate companion locking mechanism 147 which is fixed to the frame of system 110. Disc 146 and mechanism 147 may lock with each other as by engagement of gear teeth for example.

For urban use, optional direct engagement between input shaft 111 and pump 120 is provided by clutch 160 to produce the maximum braking force within the lowest speed range. Pump 120 may be made regenerative to provide storage of braking energy as previously described which can then be recovered and routed directly to input shaft 111 with torque limit clutch 112 being disengaged.

FIG. 4 shows the relationship between the retarding force of system 110 and vehicle speed. Similar to FIG. 2, line 195 represents the maximum desired braking force. Curve 201 represents the force/mph relationship for a single rotor 131, with each of the other rotors 132, 133, 134 and 135 having an identical relationship. Curve 206 represent both rotors 131 and 132 operating freely with rotors 133, 134 and 135 held idle. Curve 207 represents rotors 131, 132 and 133 operating freely with rotors 134 and 135 idle Curve 208 represents rotors 131, 132, 133 and 134 rotating freely together with rotor 135 idle, while curve 209 represents all five rotors running freely. For a particular choice of component sizes, with all five rotors running freely, curve 209 will reach the maximum desired braking force at 100% of the maximum intended vehicle speed range. (Point 220) A single rotor 131 will meet the maximum desired braking force line 195 at 20% of maximum vehicle speed, (point 216), two rotors 131 and 132 operating freely will meet it at 40%, (point 217), and so on. A microprocessor (not shown) would be used to modulate all the locking, clutch and pump functions.

Similar to the preferred embodiment shown in FIG. 1, the five-rotor embodiment of FIGS. 3 and 4 would operate as follows:

For speeds between 0 and 20%, rotors 132, 133, 134 and 135 are locked to ground while rotor 131 is free to rotate. Initially, all clutch plates 161-165 are disengaged so that pump 120 sees no input. If system 110 were engaged at 20%, rotors 132-135 would be locked, only rotor 131 would be operating and the retarding force at that moment would be at 216. As the vehicle slows, the retarding force from rotor 131 follows curve 201. Optionally, pump 120 may be engaged by engaging clutch plate 161 against gear 166 to provide the additional retarding force needed to meet line 195 below 20% vehicle speed.

If system 110 were engaged at 40%, rotors 133, 134, and 135 would be locked, rotor 132 would be unlocked, all clutch plates and thus pump 120 would be disengaged and rotors 131 and 132 would turn freely producing a retarding force indicated by point 217. As the vehicle slowed, the retarding force would be along curve 206. Instead, clutch plate 162 is engaged engaging pump 120, which initially is at zero pressure. As the vehicle speed decreases from 40%, pump pressure of pump 120 is appropriately increased to maintain constant retardation. The sum of the torques from rotor 132 and from pump 120 must be balanced within epicyclic gear train E1 causing the speed of output rotor 131 to remain constant. Rotor 132 speed correspondingly falls.

This resulting output of rotor 131 is the retarding torque, which value corresponds with the maximum desired level on line 195. When the vehicle speed reaches 20%, pump pressure reaches a maximum, rotor 132 stops, rotor 131 rotates at full speed at point 216, still on maximum desired force line 195. At this instant, rotor 132 is locked by locking disk 146, clutch plate 162 is disengaged and pump pressure goes to zero. Now retarder system 110 is exactly as described above for engagement at 20% and its operation could continue till 0% is reached.

If system 110 were engaged at 60%, rotors 134 and 135 would be locked, all clutches would be disengaged, pump pressure would be at zero, and rotors 131, 132 and 133 would run freely with the retarding force being on line 195 at point 218. As the vehicle slows, the retarding force would follow curve 207. Instead, clutch plate 163 engages pump 120, which initially is at zero pressure. With the vehicle speed falling from 60%, the pump pressure appropriately increases (as commanded by the microprocessor, not shown). Again, the sum of torques acting on shaft 143 from rotor 133 and from pump 120 must be balanced within E2. Rotors 131 and 132, running at identical speeds through E1 and E2 will be balanced through shaft 152 by the torque of shaft 143 through E3. The result is a retarding force along line 195. As 40% is reached, pump pressure reaches maximum, rotor 133 stoPs and is locked to ground, clutch plate 163 is disengaged, pump pressure goes to zero, clutch plate 162 is engaged and the retarding force is at point 217. Operation of system 110 below 40% is then as described above.

Operation of system 110 for engagement at 80% is as above except that operation begins with the first four rotors. 131, 132, 133 and 134 running freely with rotor 135 locked and with the retarding force being on line 195 at point 219. It can readily be seen that an infinite number of rotors could be used limited only by practical considerations such as cost, size and weight. It is also apparent that the system can be engaged at any speed (64%, for example) with the microprocessor (not shown) engaging, disengaging and setting the proper functions instantaneously to provide the maximum desired retarding force along 195, or to provide any retarding force commanded by the driver.

It should be noted that the transitions among components of retarder system 110 are handled by a microprocessor, (not shown), and, along with torsion coupling 118, torque limit clutch 112 and sprag clutch 115, a smooth operation from engagement to eventual stopping or disengagement is provided.

Use of three or more rotors is not limited to the mechanical hook-up shown in FIG. 3. Other embodiments are contemplated wherein the bevel gear 121 and connecting shaft 122 design is replaced by an in-line shaft and clutch system. Further, the rotor-epicyclic chain could be connected in a polygonal or cluster configuration, for example.

In another embodiment, variable inlet geometry is applied to the intake of the rotors. By modifying the whirl energy of the inlet air, the energy dissipation of a rotor and thus the retardation level can further be varied.

Figure 5:
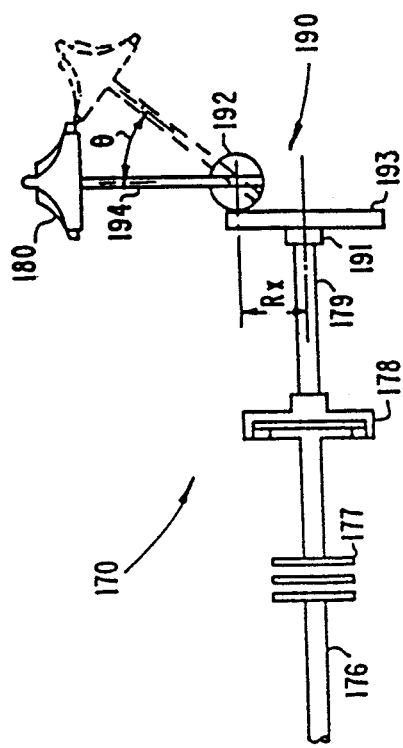
FIG. 5 is a diagrammatic view of a retarder in accordance with another embodiment of the present invention.

In another embodiment shown in FIG. 5, a single aerodynamic rotor 180 is employed to provide the retarding force. As in the preferred embodiment (FIG. 1), a torque limit clutch 177 and sprag clutch 178 are serially connected to selectively provide engagement with input shaft 176 and to provide anti-skid characteristics. The control means for controlling the speed of rotor 180 is provided by variable ratio drive system 190. Such systems are varied and well known. Driven shaft 179 of sprag clutch 178 is rigidly axially connected to rotating drive plate 191. Pivotable drive sphere 192 is rigidly mounted at one end of rotor shaft 194 and is in constant contact with the face 193 of drive plate 191. Rigidly, axially mounted at the opposite end of rotor shaft 194 is rotor 180. With rotor shaft 194 perpendicular to driven shaft 179, the relationship of retarding force to vehicle speed (through retarding system 170) would be along curve 232. If sphere 192, shaft 194 and rotor 180 were pivoted 30 degrees (as shown in phantom), the retarding force would be along curve 230. For certain component sizes, proper modulation of the angle of shaft 194 could then produce a constant retarding force (5,000 lbs., for example) along line 235. The operating range of maximum retard can be further extended at speeds to the left of point 237, by radial movement of sphere 192 away from the center of face 193. By thus increasing the radius of contact $R_x$ to sphere 192, a retarding force at speeds below point 237 may be obtained along curves 239.

Other embodiments are also contemplated wherein a single epicyclic would be used in conjunction with a multi-speed autochange gearbox to vary the input speed. One of the two outputs of the epicyclic would drive and be controlled by a pump. The second output would drive serially connected aerodynamic rotors. Clutching means for engaging/disengaging the rotors as needed would be operated with the other components through a microprocessor to produce a smooth retarding torque over a broad speed range.

Any of the embodiments presented above may be standard equipment or later added options. In either case, they may be integrated directly into the vehicle s transmission or to one or more axles.

Figure 10:
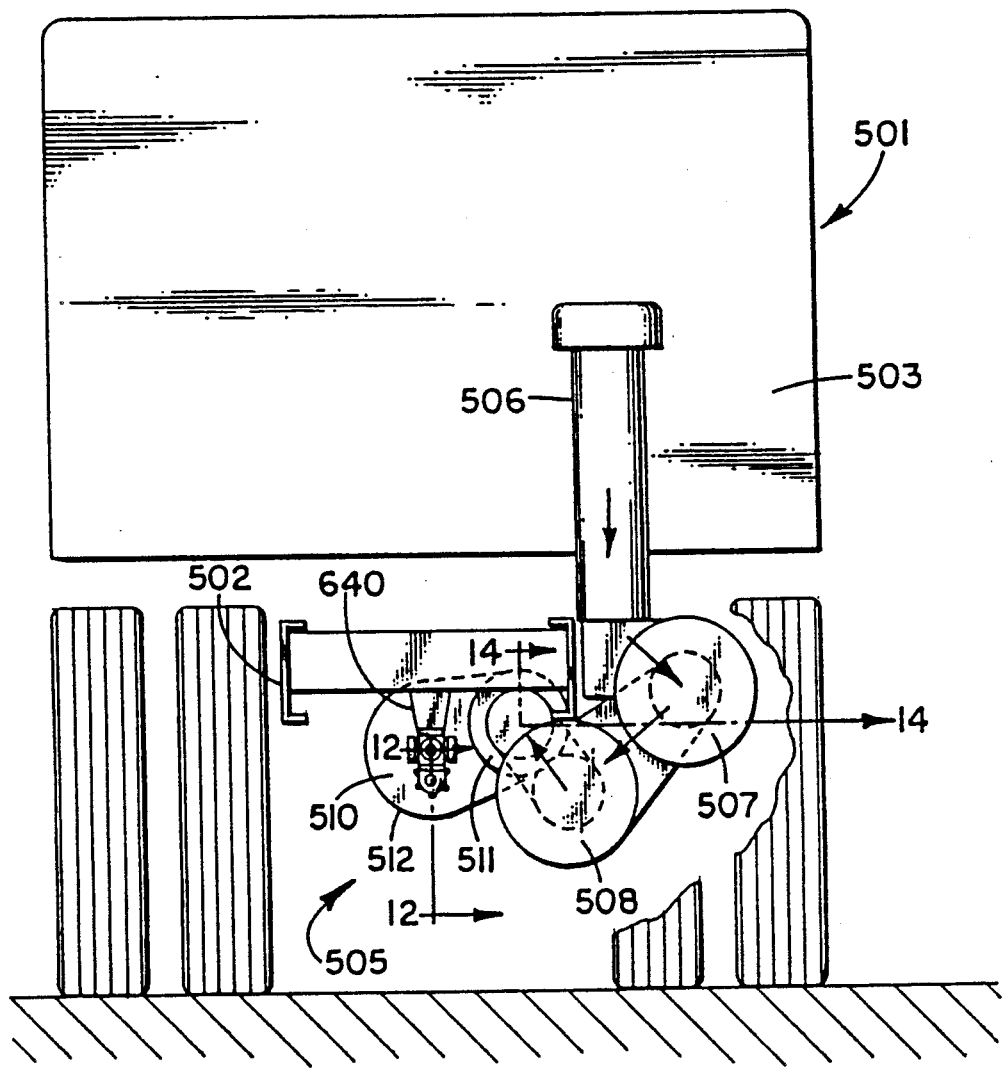
FIG. 10 is a rear, elevational view of the retarder of yet another embodiment of the present invention and shown adapted to a truck and with a portion broken away for clarity.
Figure 11:
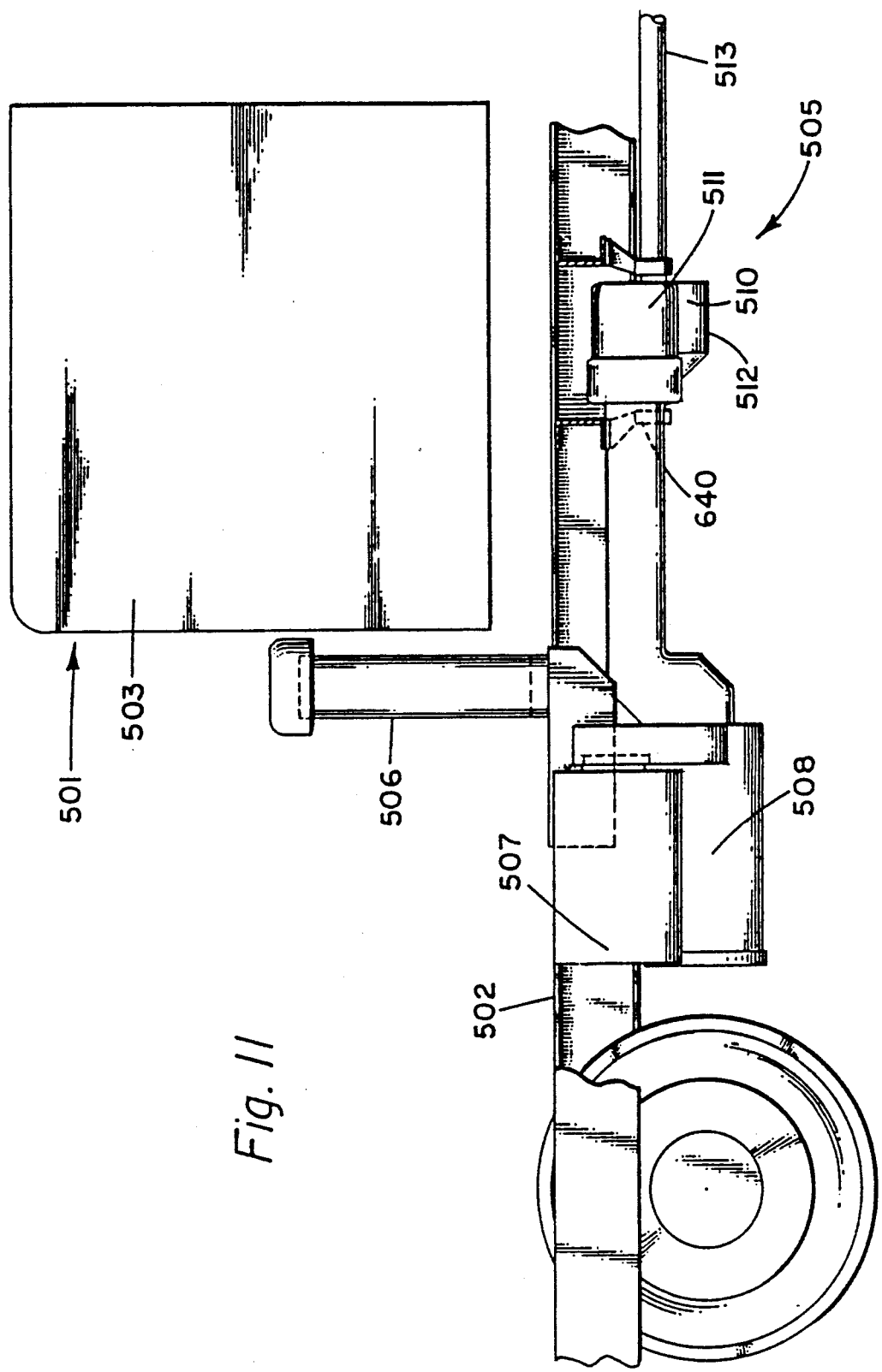
FIG. 11 is a side view of the retarder of FIG. 10 with portions broken away for clarity.

Referring now to FIGS. 10 and 11, there is shown a retarder assembly 505 in accordance with another embodiment of the present invention. FIGS. 10 and 11 show retarder 505 adapted to a double sleeper Kenworth W900B Aerodyne truck 501. Retarder assembly 505 is mounted to and partially below truck frame 502 and below and rearwardly of the cab portion 503 with intake duct assembly 506 mounted to the rear of cab portion 503. Retarder assembly 505 principally includes a rotor assembly 511 and a clutch assembly 510 which selectively engages rotor assembly 511 with the vehicle's driveline 513 and which varies the ratio of the speed between rotor assembly 511 and shaft 515. The components of clutch assembly 510 and of rotor assembly 511 are disposed for mutual engagement all within common housing assembly 512. Housing 512 is suspended from frame 502 by front and rear trunnion bearings 639 and 640. Housing 512 is thereby prevented from axial, lateral or vertical movement, but can rotate about drive line axis 514 as permitted by load sensing link 595 (see FIG. 16) or similar bracing member. Air entering duct assembly 506 passes through an air filter 507, through a heat exchanger 508 and into the intake of rotor assembly 511.

Figure 12:
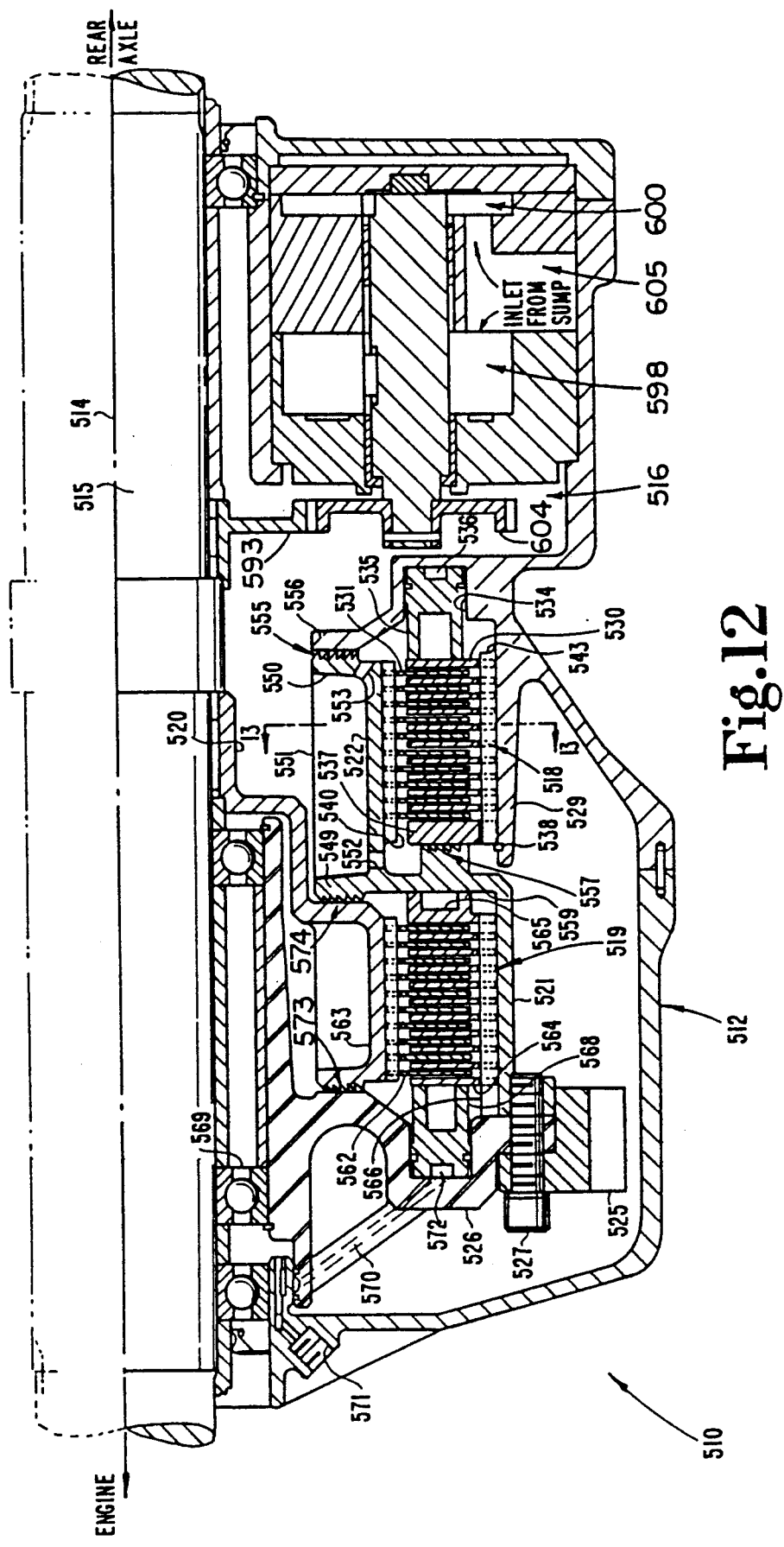
FIG. 12 is a side, cross-sectional view of the clutch assembly of the retarder of FIG. 10 taken along the lines 12—12 and viewed in the direction of the arrows.

Referring now to FIG. 12, one half of a cross-sectional view of the clutch assembly 510 of the present embodiment is shown. It should be understood that, except for the positive displacement pump 516, various fluid inlet lines and as will hereinafter be specified, the operative components are symmetrical about axis 514 of drive shaft 515. The retarder of the present embodiment is connected in a conventional manner with the drive train of the vehicle by retarder drive shaft 515 which is connected at one end to the engine through the transmission and at its other end to the vehicle drive shaft leading to the rear axle. Generally, clutch assembly 510 includes a static clutch pack 518 and a dynamic clutch pack 519, all surrounding shaft 515 and all enclosed within housing 512. Near the center of and surrounding shaft 515 is splined the inner drive unit 520 of dynamic clutch pack 519. Upon engagement of clutch pack 519, inner drive unit 520 drives an outer housing 521. Housing 521 is integrally formed with inner cylindrical hub 522 of static clutch pack 518. The single unit formed by housing 521 and inner hub 522 is rigidly connected with drive gear 525 and drive gear mounting hub 526 by a number of radially spaced screws 527 (one shown).

Referring more specifically to static clutch pack 518, housing 512 defines an outer cylindrical housing 529. Clutch pack 518 includes 10 identical annular separator plates 530 and 10 identical friction plates 531 which are stacked in axially alternating fashion, radially between inner cylindrical hub 522 and outer cylindrical housing 529. Housing 512 further defines a static clutch piston cylinder 534 in the form of an annular channel opening to the left as shown in FIG. 12. An annular shaped static clutch piston 535 is disposed to reciprocate within piston cylinder 534 with concentric seals provided therebetween. A static clutch pressure chamber 536 is defined between piston 535 and piston cylinder 534. Hydraulic fluid pressure is provided to pressure chamber 536 from the positive displacement pump 516 (as will be described hereinafter) from appropriate supply lines (not shown). Increasing pressure in pressure chamber 536 biases piston 535 forwardly (to the left in FIG. 12) and against the rearmost separator plate 530. The stacked, alternating plates 530 and 531 are thereby placed under uniform, axial compression between piston 535 and an annular, static clutch backing plate 537. Backing plate 537 is slightly thicker, but is otherwise identical to separator plates 530. Backing plate 537 is disposed at the forward end of cylindrical housing 529 and is retained from forward movement therebeyond by a circlip 538. Immediately adjacent backing plate 537 is the forwardmost of the friction plates 531.

Figure 13:
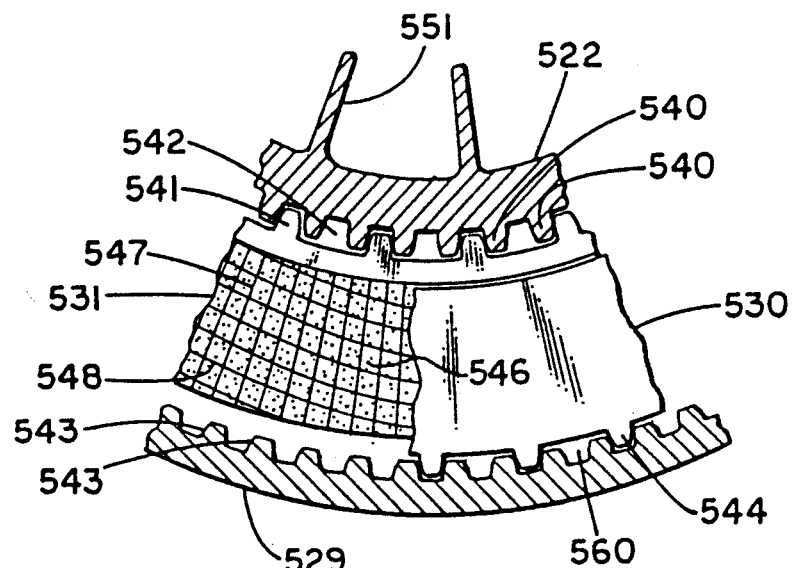
FIG. 13 is a cross-sectional view of a representative sector portion of the static clutch of FIG. 12 taken along the lines 13—13 and viewed in the direction of the arrows and with a portion broken away for clarity.

In FIG. 13 there is shown a sectional view of a representative sector portion of the static clutch taken along the lines 13—13 in FIG. 12 and with a portion of separator plate 530 broken away. Referring now to both FIGS. 12 and 13, inner cylindrical hub 522 is covered with axially aligned, circumferentially spaced splines 540. Each friction plate 531 has an appropriate number of inwardly extending dogs 541 adapted to mesh with splines 540. There should be at least three, equally spaced dogs 541, and in the preferred embodiment, there are half as many dogs 541 as there are splines 540. By mounting all the friction plates 531 so that the dogs 541 are all nested between the same pairs of splines, every other valley between odd pairs of splines will become an axial oil flow groove. In a similar fashion, the inner surface of outer cylindrical housing 529 is covered with axially aligned splines 543 which mesh with a lesser number of outwardly extending dogs 544 of separator plates 530. Backing plate 537 is also provided with an appropriate number of outwardly extending dogs which mesh with splines 543 of housing 529. Separator plates 530 and backing plate 537 are thus fixed with housing 512 (via cylindrical housing 529) against rotation about axis 514 but are allowed somewhat to slide axially along axis 514 within cylindrical housing 529. Likewise, friction plates 531 are fixed to rotate with cylindrical hub 522 (and thereby with outer housing 521) about axis 514 and are allowed to slide freely along axis 514 on the outside of hub 522.

As is known in the industry, friction plates 531 are coated on both sides with an appropriate material such as paper. Separator plates 530 are steel. In the present embodiment, the coating 546 is scored forming radial grooves as at 547 and outwardly spiraling pattern 548. Further, the components of clutch pack 518 are sized such that there is a sizable gap between the outer surfaces of splines 540 and the inner diameter of plate 530. This gaP, along with score lines 547 and 548 and oil flow grooves 542 promote oil flow through and to all surfaces of the static clutch pack 518. This helps promote the best possible heat exchange rate from the components of clutch pack 518.

Cylindrical hub 522 defines a pair of inwardly extending, annular discs 549 and 550. A number of oil paddle ribs 551 extend inwardly from hub 522 and between discs 549 and 550. Ribs 551 are spaced about two inches apart about the interior cylindrical surface of hub 522. Hub 522 also defines a number of holes 552 and 553 as shown in FIG. 12. There are one set of holes 552 and 553 located between each pair of adjacent ribs 551. A screw-back seal 555 is created by a set of threads on the rearwardly facing surface of disc 550 and a complimentary and adjacent, flat and annular flange 556 of housing 512. The relationship between the threads and flange 556 is such that as hub 522 rotates relative to flange 556, oil is directed outwardly between flange 556 and disc 550. Further, as hub 522 rotates, ribs 551 promote an even distribution of oil such that, along with acting centrifugal forces, oil is uniformly channeled through the spaced holes 552 and 553 and to plates 530 and 531. Another similar screw-back seal 557 is created by backing plate 537 and by a threaded portion extending rearwardly from annular connecting portion 559 which portion 559 connects hub 522 and outer housing 521. As hub 522 rotates, oil flows only outwardly through holes 552 and 553 and through seal 555, and, despite the acting centrifugal forces, screw-back seal 557 causes oil to flow substantially entirely inwardly thereat. The majority of oil must pass, therefore, through the grooves 542 of hub 522 and uniformly between and along plates 530 and 531 and outwardly therefrom, through oil flow grooves 560 in cylindrical housing 529, and eventually to the heat exchanger 508.

Dynamic clutch pack 519 is similarly constructed having friction plates 562 adapted to rotate with but slide axially along inner cylindrical hub 563. Hub 563 is integrally formed as a single unit with inner drive unit 520. Separator plates 564 are alternately and coaxially stacked with friction plates 562 and are adapted to rotate with but slide axially within cylindrical outer housing 521. A dynamic clutch backing plate 565 is generally annular and has outwardly extending dogs which engage with the splines 566 of housing 521 and cause it, like separator plates 564, to rotate with housing 521. Backing plate 565 abuts the forward side of connecting portion 559, limiting the rearward axial movement of plate 565 and providing a pressure base against which alternating plates 562 and 564 can be compressed by annular, dynamic clutch piston 568. Dynamic clutch pack 519 also includes screw-back seals at 573 and 574 and score lines on the friction plates to properly channel the oil flow uniformly around and between the friction and separator plates 562 and 564 and outwardly therefrom through oil grooves in cylindrical outer housing 521, and eventually to heat exchanger 508.

Drive gear mounting hub 526 is mounted to rotate freely about shaft 515 by appropriate bearings 569. Hub 526 also defines a channel 570 for pressurized hydraulic fluid from an appropriate port 571 to dynamic clutch pressure chamber 572.

Positive displacement pump 516 is a conventional internal-gear pump, its internal gears having a one tooth difference. Pump 516 is actuated by a pump pinion 604 which is driven by a pump drive gear 593 which is splined to shaft 515. Pump 516 further includes a common inlet 605 at the bottom of housing 516.

The cooling oil is circulated by the left-hand chamber 598 of pump 516 through the heat exchanger 508 (FIGS. 10 and 11). The right-hand chamber 600 provides fluid pressure to actuate both clutch packs 518 and 519. Referring to FIGS. 10 and 11, cool, ambient air drawn in through duct 506 passes through air filter 507 and then through heat exchanger 508 where it cools the heated oil. The higher temperature air from heat exchanger 508 is then drawn through the intake 599 of rotor 580. Exhaust (not shown) from rotor 580 is provided with an appropriate muffling device and is placed in any convenient location below or behind the vehicle's cab 503.

Referring now to FIG. 14, there is shown the rotor assembly 511 of the present embodiment. Rotary motion is transferred from clutch assembly 510 to rotor assembly 511 by drive gear 525 which is engaged with and drives an idler pinion (not shown) which is engaged with and drives drive pinion and planet carrier 577 of rotor assembly 511. Along with carrier 577, rotor assembly 511 includes a planetary gear assembly 578 and an aerodynamic rotor 580, all of which are enclosed within common housing 512. Carrier 577 is mounted by bearing members 581 and 582 to rotate about rotor axis 583. Carrier 577 includes outwardly extending gear teeth 584 which are in constant meshing engagement with drive gear 525 via the intermediary, but offset idler pinion (not shown). Carrier 577 is also adapted to receive three planet gears 585 (one shown) which are spaced 120° apart about axis 583. Planet gears 585 are in meshing engagement exteriorly with ring gear 587, which is fixed to housing 512, and sun gear 588, which is fixed to rotate with rotor shaft 589 about axis 583. Rotor shaft 589 is mounted for rotation within housing 512 by appropriate bearing members 590 and 591. The speed ratio of carrier 577 to rotor shaft 589 through planetary gear assembly 578 is approximately 10:1. Rotor 580 is received onto the end of rotor shaft 589 and held thereon by nut 592.

In operation, as the vehicle drive train and shaft 515 rotate, also rotating are inner drive unit 520 (splined thereto), cylindrical hub 563 and friction plates 562 coaxially and in synchronization therewith. At this point, in the disengaged condition, dynamic clutch pressure chamber 572 is in a low pressure state and friction plates 562 rotate easily between separator plates 564. With piston 568 disengaged, only minor parasitic losses are encountered by the rotation of friction plates 562 between separator plates 564.

Engagement of the retarder by introducing fluid pressure into chamber 572 causes piston 568 to move rearwardly, compressing plates 562 and 564 against one another and against backing plate 565. Developed frictional forces between the plates cause separator plates 564 to begin to rotate with friction plates 562. Consequently, outer housing 521, whose interior splines are in meshing engagement with the dogs of separator plates 564, is caused to rotate with separator plates 564. Drive gear 525, fixed to outer housing 521 and drive gear mounting hub 526, is thereby caused to rotate about axis 514 of shaft 515. At some full pressure valve to chamber 572, friction plates 562 no longer slip relative to separator plates 564 and outer housing 521 and drive gear 525 turn as a unit with shaft 515. Rotor 580 is thereby directly coupled with shaft 515. A microprocessor 594 (see FIG. 16) monitors, through appropriate sensors, various critical values such as the hydraulic actuating pressure to clutch packs 518 and 519, the speed of rotor 580, the hydraulic oil pressure supply in pump 516, the speed of drive line 515, and, through a load sensing link 595 pivotally attached at one end 596 to housing 512 and at its other end 597 to the vehicle frame 502, the torque exerted through the retarder. As rotor 580 reaches its maximum speed rating, microprocessor 594 will appropriately reduce, via known valve systems, the hydraulic pressure to pressure chamber 572 of clutch pack 521. Friction plates 562 will thereby slip somewhat relative to separator plates 564, but separator plates 564, and thereby rotor 580, will continue to rotate at some percentage less than maximum speed. The energy associated with the retarding torque acting on housing 521 over that which is dissipated in the form of work to turn rotor 544 is heat of friction developed between plates 526 and 564. This heat is absorbed by the oil flowing through the clutch packs and circulating throughout housing 512.

In practice, the components of retarder assembly 505 are designed so that maximum compressor horsepower is reached at approximately 50% of the vehicle's top speed (top speed being 80 mph, for example). Assuming the vehicle approaches a hill at top speed (80 mph), the operator selects maximum retard and turns the unit on. By selecting maximum retard, the operator has instructed microprocessor 594 to administer the amount of fluid pressure to dynamic clutch piston 568 which corresponds with rotor 580 running at maximum speed and absorbing maximum horsepower. Maximum horsepower of rotor 580 is normally reached at about 50% of drive shaft (515) speed. As rotor assembly 511 accelerates beyond the maximum rotor speed, dynamic clutch pack 519 begins to slip and maintain the predetermined torque level and therefore rotor speed. In other words, during steady state operation, at a 50% maximum input shaft speed, there is normally no slippage in the dynamic clutch and the output retardation torque is due entirely to the energy absorption of rotor 580. Above 50%, the output retardation torque is the sum of the rotor absorption plus the slip energy going into dynamic clutch pack 519 and ultimately into the circulating cooling oil. The contribution of the two may be managed by simply varying fluid pressure to piston 604 to obtain any level of braking desired up to the design limit.

As drive shaft 515 speed drops below 50%, clutch pack 519 is fully engaged with no slippage and the retardation drops off sharply. The retarding torque applied to cylindrical hub 563 may then be augmented by variably engaging static clutch pack 518. In an emergency situation, static clutch pack 518 could also be engaged above 50% drive shaft speed to augment retardation and prevent a runaway.

Figure 15:
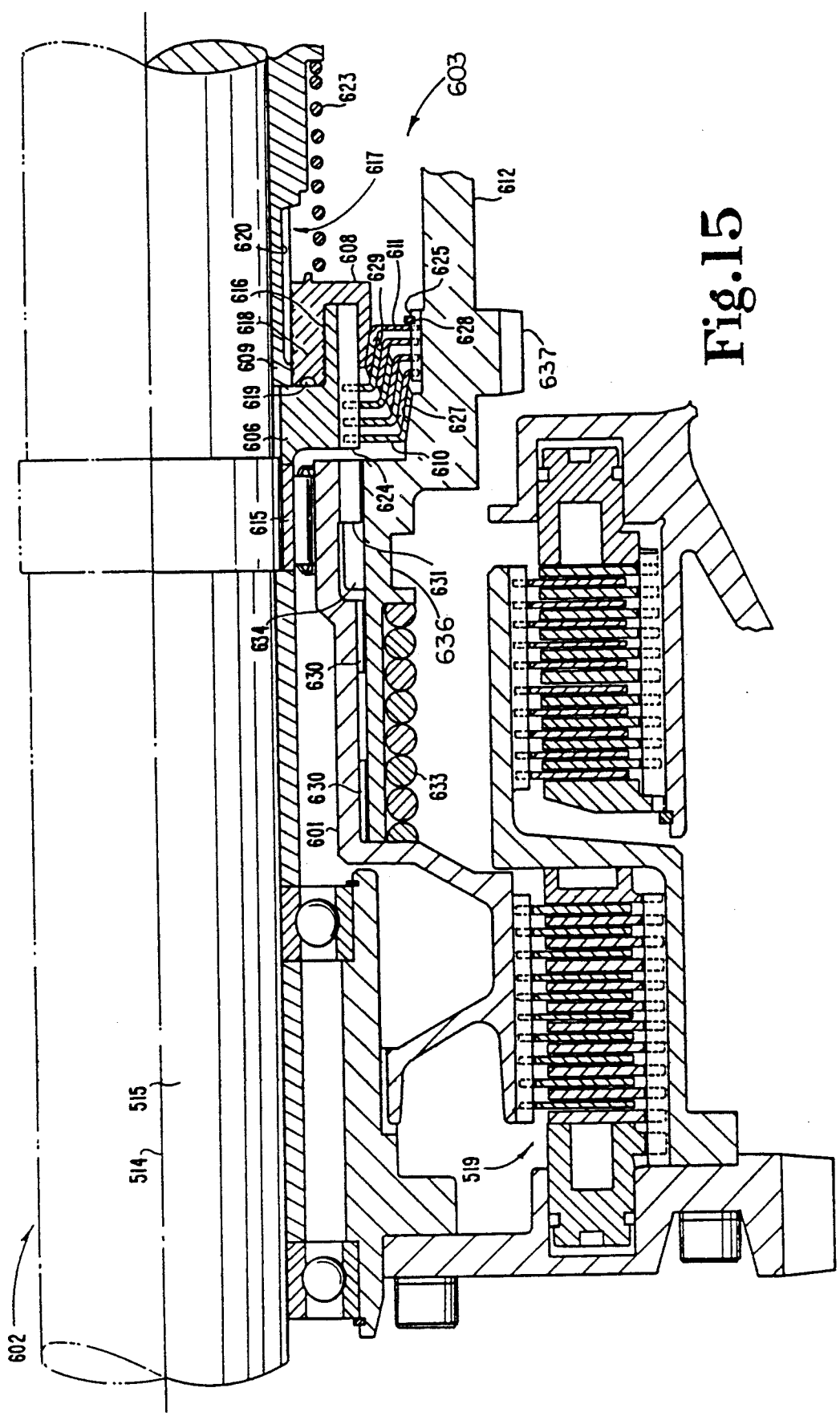
FIG. 15 is a side, cross-sectional view of the clutch assembly of another embodiment of the retarder of FIG. 10.

In another embodiment shown in FIG. 15, the inner drive unit 601 of clutch assembly 602 is not splined directly to shaft 515 as is drive unit 520 shown in FIG. 12. Rather, drive unit 601 is selectively engaged by a synchro dog clutch assembly 603. Although dog clutch assembly 603 adds cost and weight to the retarder, it all but eliminates parasitic losses when the retarder is not engaged. Again, clutch assembly 602 is symmetrical about shaft axis 514 and therefore the following description and FIG. 15 will be directed to only one half of clutch assembly 602 except where specified.

Generally, dog clutch assembly 603 includes dashpot 606, inner cone clutch member 608, spacer 609, friction cones 610, separator cones 611 and outer drive member 612. All of these components are generally annular and are coaxial about axis 514. Dashpot 606 is splined to shaft 515, spacer 609 is rigidly secured to shaft 515 in any appropriate manner such as by a pressure fit or by clamping, and inner member 608 is splined to spacer 609, all in order that dashpot 606, spacer 609 and inner member 608 rotate as a single unit with shaft 515. Because spacer 609 is rigidly secured to shaft 515 it cannot move axially along shaft 515. Dashpot 606 is prevented from moving axially along shaft 515 by spacer 609 on one side and by forward spacers such as spacer 615 on the other. Dashpot 606 and spacer 609 together define a rearwardly opening, generally cylindrical pressure chamber 616 which receives a cylindrical piston portion 618 of inner cone clutch member 608. The forward end of piston portion 618 defines an annular cavity 619 which is semi-circular in cross-section. Spacer 609 has a reduced diameter section 617 about which inner member 608 axially slides. A very small cross-sectional area oil channel 620 is defined along the reduced diameter portion 617 and extends nearly to, but about 0.2 inches from the forward end spacer 609. A spring 623 is provided to bias inner member 608 forwardly. As inner member 608 is urged rearwardly (to the right in FIG. 15), piston portion 618 is urged out of pressure chamber 616 which action attempts to draw oil into cavity 619. Due to restricted seepage of oil between piston portion 618 and spacer 609, the oil flow rate into cavity 619 is severely restricted and the negative pressure created thereby in cavity 619 along with the bias of spring 623 acts against rearward movement of inner member 608. Once piston portion moves rearwardly the approximate 0.2 inches, there is communication between oil channel 620 and cavity 619. Inner member 608 is then restricted against rearward movement only by the minor spring force of spring 623.

Dashpot 606 is splined exteriorly at 624 and friction cones 610 have a number of interiorly extending dogs adapted to engage with the exterior splines 624. Friction cones 610 thus rotate as a unit with dashpot 606, but can freely slide coaxially along the outside of dashpot 606. Similarly, outer drive member 612 is interiorly splined at 625 and separator cones 611 have a number of exteriorly extending dogs adapted to engage with the interior splines 625. Separator cones 611 thus rotate as a unit with drive member 612, but can freely slide coaxially along the inside of drive member 612. As with dynamic and static clutch packs 519 and 518, friction cones 610 and separator cones 611 are alternately stacked as shown in FIG. 15. A conical stop surface 627 provided by drive member 612 and a circlip 628 provide the limits of forward and rearward axial travel of the cones, respectively. Inner cone clutch member 608 further defines a dynamic, conical stop surface 629 against which stacked cones 610 and 611 bear when synchro clutch assembly 603 is engaged.

Instead of being splined to rotate with shaft 515 as shown in FIG. 12, inner drive unit 601 is bearingly mounted to rotate freely about shaft 515 and is splined at 631 to rotate with outer drive member 612. Bearings at 630 are provided to allow drive unit 601 to slide telescopically relative to drive member 612 and to provide support throughout the range of relative motion therebetween. Drive member 612 is sized and mounted so as to be able to telescopically reciprocate along the outside of inner drive unit 601 between a disengaged position and an engaged position. In the disengaged position shown in FIG. 15, inwardly extending splines 634 of drive member 612 are engaged only with outwardly extending splines 631 of inner drive unit 601. In the engaged position (not shown), drive member 612 has been urged rearwardly (to the right in FIG. 15) by a return spring 633 whereby splines 634 are now engaged with both splines 631 of drive unit 601 and splines 624 of dashpot 606. In the engaged position, shaft 515 drives dashpot 606 which drives member 612 via splines 624 and 634, and drive member 612 drives inner drive unit 601 via splines 634 and 631. Outer drive member 612 is normally held in the disengaged position, against the bias of spring 633, by a standard thrust bearing and shifting fork combination (not shown) commonly found in automotive clutch mechanisms. A groove 636 is defined by drive member 612 to receive the thrust bearing. A solenoid device controlled by the system's microprocessor 594 would be used to activate the motion of the shifting fork.

In operation, the synchro dog clutch assembly would function as follows:

In the disengaged position shown in FIG. 15, outer drive member 612 is held cocked against the bias of spring 633, splines 634 are engaged only with splines 631, inner cone clutch member 608 is all the way forward with piston 618, completely received within pressure chamber 616, and friction cones 610 and stop surface 629, driven by dashpot 606 and spacer 609, rotate freely between and among separator plates 611 and drive member 612.

Upon engagement by the operator, microprocessor 594 causes the solenoid (not shown) to actuate the thrust bearing and shifting fork combination (not shown), allowing outer drive member 612 to be biased rearwardly (to the right in FIG. 15) by spring 633 which causes outer conical stop surface 627 to compress cones 610 and 611 against inner stop surface 629. Although inner member 608 may otherwise slide freely along spacer 609, the damping action of piston portion 618 and the bias of spring 623 resists the rearward movement of inner member 608 and allows the frictional forces to develop between friction cones 610 and separator cones 611. Outer drive member 612 is caused to begin rotating with dashpot 606 and shaft 515. By the time the cones' speeds have equalized, outer drive member 612 has slid rearwardly and splines 634, now rotating at the same sPeed as splines 624, begin to engage with splines 624. At this Point inner member 608 has moved rearwardly enough so that oil channel 620 is now in communication with cavity 619. Oil may now flow substantially unrestricted into cavity 619, allowing inner member 608 to move quickly to the right and allowing return spring 633 to bias drive member 612 and its splines 634 quickly into engagement with splines 624. Once splines 634 are in substantially equal, overlapping and meshing engagement with both splines 631 and 624, synchro dog clutch assembly is in the fully engaged position and shaft 515 is driving inner drive unit 601.

In this embodiment, the positive displacement pump 516 could be as shown in FIG. 12. In the alternative, the pump could be surrounding the above-described clutch assembly, symmetric about axis 514. In either case, such pump would be driven by outer drive member 612 via gear teeth 637.

Other embodiments are contemplated wherein retarder 505 is adapted to apply a retarding torque to any rotating shaft, the angular momentum of which is desired to be reduced. For example, significant masses must be started and stopped or speed controlled or position controlled for mass production events which exist on transfer lines such as in steel rolling mills and paper mills. To achieve precise modulation of the speed of these parts, the present invention may be adapted to apply a retarding torque upon a shaft of the particular system.

Figure 16:
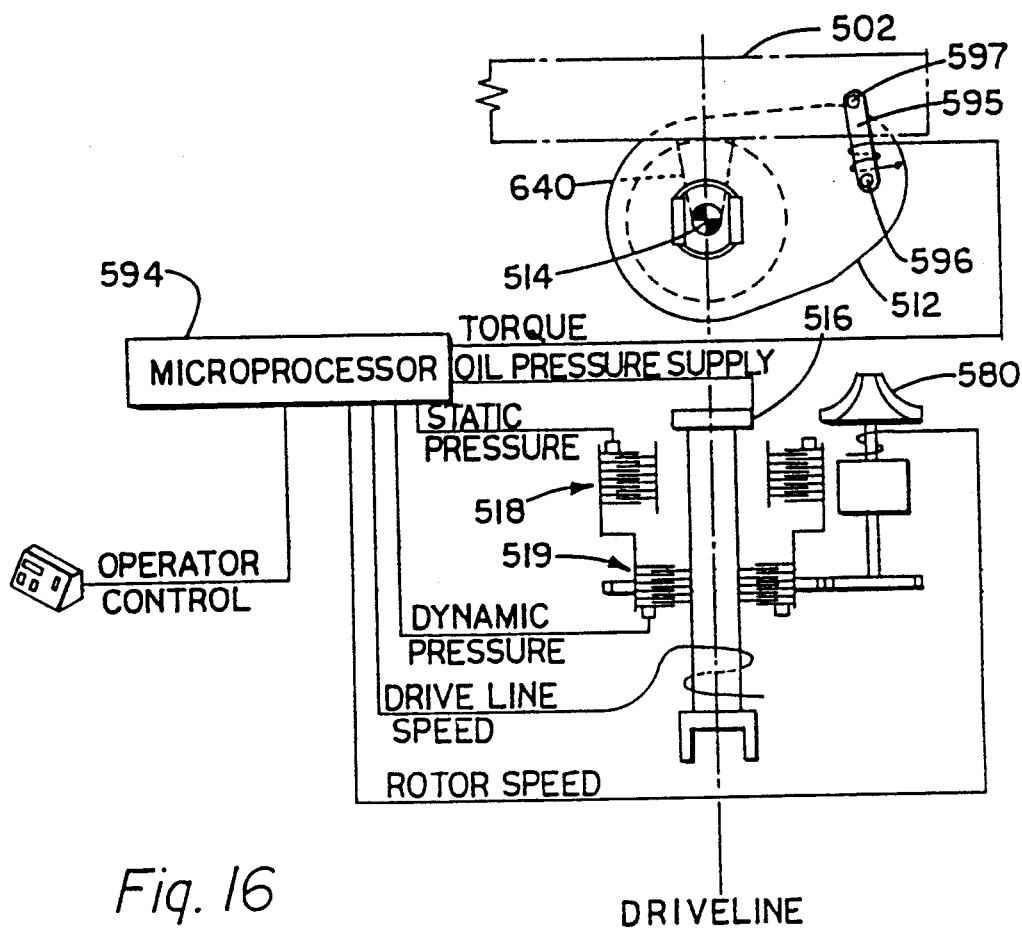
FIG. 16 is a diagrammatic view of the retarder of FIG. 10 showing the microprocessor relationship.

As shown in FIGS. 10, 11 and 16, housing 512 containing clutch assembly 510 and rotor assembly 511 is mounted to vehicle frame 502 using standard trunnion bearings 640. Housing 512 may then be secured to frame 502 against rotational movement by an appropriate bracket member. Or, in the alternative, a load sensing link 595 may be connected between the frame at 597 and the housing, at a distance from shaft axis 514, at 596. Readings taken during operation from appropriate sensors on load sensing link 595 will further enhance the ability of microprocessor 594 to provide relevant operating data and to control the retarder assembly 505. Further, by disconnecting the drive shaft to the rear axle, retarder assembly 505 can be used as a dynamometer with much greater ease than presently operating systems. Alternatively, rolling vehicle resistance and aerodynamic changes can be analyzed by the retarder during downhill tests.

Under normal operating conditions, retarder assembly 505 will perform as described. However, rotor intake operating conditions may vary. For example, ambient air may become rarified when driving through mountains or may be hotter or colder depending on the weather. Further, temperature and pressure variations to the intake air may occur due to the heat exchanger performance over the entire range of retarder operation and energy absorption. In order to compensate for such variances and to preclude choke or surge in the aerodynamic rotor, it is contemplated that inlet variable geometry be applied to the intake area of the rotor assembly. That is, appropriate temperature and pressure sensors would control (as by a valve, for example) the cross-sectional area of the air intake to the rotor.

What is claimed is:

1. A device for providing a variable retarding torque upon a rotating shaft, comprising:
   an aerodynamic rotor;
   control means, responsive to independent preselected signals, for continuously varying the ratio of the speed of said aerodynamic rotor as compared to the speed of the rotating shaft; and
   wherein said control means includes an operator variable torque limiting dynamic friction clutch operatively connected between said rotating shaft and said aerodynamic rotor, and operative to control said ratio during active operation of the device.

2. The device for providing a variable retarding torque of claim 1 wherein said control means further includes:
   a drive gear mounting hub bearingly mounted to the shaft and for rotating about the shaft, said hub mechanically connected to drive said rotor;
   an inner drive unit driven by the shaft, said drive unit adapted to drive said dynamic clutch, the operation of said dynamic clutch selectively and infinitely variable to drive said hub.

3. The device for providing a variable retarding torque of claim 2 further including a housing and a static friction clutch operatively connected between said hub and said housing.

4. The device for providing a variable retarding torque of claim 3 wherein said dynamic friction clutch and said static friction clutch are both multiple plate clutches.

5. The device for providing a variable retarding torque of claim 4 further including a multiple cone, synchro dog clutch operatively engaged between said shaft and said inner drive unit.

6. The device for providing a variable retarding torque of claim 5 wherein said rotating shaft is a drive shaft leading from the engine.

7. The device for providing a variable retarding torque of claim 6 further including a pump driven by said dog clutch and adapted to provide fluid pressure to actuate said dynamic friction clutch and said static friction clutch and to circulate cooling fluid within said housing.

8. The device for providing a variable retarding torque of claim 4 further including modulation means for providing nearly instantaneous and continuously variable modulation of the retarder torque from the device and upon the ground engaging wheel, said modulation means including a microprocessor.

9. A self-contained device for providing a retarding torque upon a rotating shaft, comprising:
   a housing;
   an inner drive unit bearingly mounted within said housing to rotate about the shaft;
   clutch means mounted within said housing and for engaging the shaft with the inner drive unit;
   an aerodynamic rotor;
   a drive gear mounting hub bearingly mounted within said housing to rotate about the shaft and to drive said rotor;
   a dynamic friction clutch mounted within said housing and adapted to drive said hub, said dynamic clutch being driven by said inner drive unit; and,
   wherein said dynamic clutch is operative to selectively, continuously, and nearly instantaneously vary the ratio of the speed of rotation of said rotor to the speed of rotation of the shaft during active operation of the device.

* * * * *

UNITED STATES PATENT AND TRADEMARK OFFICE
CERTIFICATE OF CORRECTION

PATENT NO. : 4,994,003

DATED : February 19, 1991

INVENTOR(S) : Thomas A. Oldfield

It is certified that error appears in the above-identified patent and that said Letters Patent is hereby corrected as shown below:

In block 63 of the title page, please change "1981" to --1987--.

In column 1, line 22, please change "fOrm" to --form--.
In column 1, line 26, please change "etc ," to --etc.,--.
In column 1, line 39, please change "Jacobs" to --Jacob's--.
In column 1, line 57, please insert a period after "control".
In column 2, line 45, please change "the", second occurrence, to --The--.
In column 2, line 47, please change "engged" to --engaged--.
In column 2, line 47, please change "eliminated" to --eliminating--.
In column 3, line 39, "FIG. 15" should begin a new paragraph.
In column 3, line 41, "FIG. 16" should begin a new paragraph.
In column 4, line 33, please insert a period after "example)".
In column 5, line 7, please insert a comma after "example".
In column 7, line 1, please insert a period after "reached".
In column 7, line 54, please change "Discover" to --Discover--.
In column 7, line 67, after "operation" please insert --to insure smooth engagement and provide a rapid step change in braking effort--.
In column 8, line 10, please insert a period after "330".
In column 8, line 67, please insert a comma after "slows".
In column 9, line 54, please change "30" to --310--.
In column 10, line 14, "One" should begin a new paragraph.
In column 11, line 27, please insert a period after "smaller".

UNITED STATES PATENT AND TRADEMARK OFFICE
CERTIFICATE OF CORRECTION

PATENT NO.  : 4,994,003
DATED       : February 19, 1991
INVENTOR(S) : Thomas A. Oldfield It is certified that error appears in the above-identified patent and that said Letters Patent is hereby corrected as shown below:

In column 11, line 30, please change "Produced" to --produced--.
In column 12, line 27, please insert a period after "idle".
In column 12, line 61, please insert a comma after "engaged".
In column 13, line 28, please change "stoPs" to --stops--.
In column 13, line 35, please delete the period after "rotors".
In column 16, line 15, please change "gaP" to --gap--.
In column 20, line 60, please change "sPeed" to --speed--.
In column 20, line 61, please change "Point" to --point--.
In column 21, line 11, please change "aPPly" to --apply--.

Signed and Sealed this

Thirtieth Day of June, 1992

Attest:

DOUGLAS B. COMER

Attesting Officer

Acting Commissioner of Patents and Trademarks